US007280260B2

(12) United States Patent
Hagai et al.

(10) Patent No.: US 7,280,260 B2
(45) Date of Patent: Oct. 9, 2007

(54) COLOR CONVERTING APPARATUS AND COLOR CONVERTING METHOD FOR CONVERTING INPUT IMAGE DATA INTO CONVERTED IMAGE DATA

(75) Inventors: Naoki Hagai, Komaki (JP); Masashi Kuno, Ohbu (JP); Masaki Kondo, Toyoake (JP); Masashi Ueda, Nagoya (JP); Masahiro Nishihara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 973 days.

(21) Appl. No.: 10/255,644

(22) Filed: Sep. 27, 2002

(65) Prior Publication Data

US 2003/0072043 A1 Apr. 17, 2003

(30) Foreign Application Priority Data

Sep. 28, 2001 (JP) ............................. 2001-299659

(51) Int. Cl.
*G03F 3/08* (2006.01)
(52) U.S. Cl. ...................... 358/518; 358/515; 358/519; 358/523; 382/162; 382/167; 382/274; 382/312; 382/317; 382/321; 345/426; 345/427; 345/589; 345/600; 348/254; 348/256
(58) Field of Classification Search ................ 358/518, 358/515, 519, 523; 382/162, 167, 274, 312, 382/317, 321; 345/426–427, 600, 604; 348/254, 348/256; 250/372

See application file for complete search history.

(56) References Cited

U.S. PATENT DOCUMENTS

| 5,748,329 | A | * | 5/1998 | Chang ........................ 382/167 |
| 5,835,624 | A | | 11/1998 | Ueda et al. |
| 6,466,334 | B1 | * | 10/2002 | Komiya et al. .............. 358/1.9 |
| 6,567,543 | B1 | * | 5/2003 | Shiraiwa et al. ............ 382/167 |

FOREIGN PATENT DOCUMENTS

JP A 9-116776 5/1997

\* cited by examiner

*Primary Examiner*—Aung S. Moe
*Assistant Examiner*—Jacob P. Rohwer
(74) *Attorney, Agent, or Firm*—Oliff & Berridge, PLC

(57) ABSTRACT

For each paper type, a plurality of two-dimensional excitation characteristics tables Ti are provided in one to one correspondence with a plurality of colors i. The excitation characteristics table Ti for each color i contains a plurality of sets of excitation-reflectance data Bi ($\lambda_0$, $\lambda$) in a two-dimensional matrix form, for a plurality of combinations of incident light wavelengths $\lambda$ and reflected light wavelengths $\lambda_0$. The excitation-reflectance data Bi ($\lambda_0$, $\lambda$) indicates the ratio of the amount of the reflected light wavelength $\lambda_0$ generated in response to incidence of the incident light wavelength $\lambda$, with respect to the amount of the incident light wavelength $\lambda$. Using the two-dimensional excitation characteristics table Ti corresponding to the user's selected paper type and using the spectral radiation characteristics S($\lambda$) of the user's selected light source type, Equations (9)-(11) are calculated to create an output profile, and color conversion is performed by using the output profile.

33 Claims, 20 Drawing Sheets

EXCITATION CHARACTERISTICS TABLE — 14c

| i-th COLOR (CMYK) / PAPER TYPE | NORMAL PAPER (I) | GLOSSY PAPER (II) | COATED PAPER (III) |
|---|---|---|---|
| 0-th COLOR (0,0,0,0) | $T_0$ | ⋮ | ⋮ |
| 1-th COLOR (10,0,0,0) | $T_1$ | | |
| ⋮ | ⋮ | | |
| i-th COLOR (C, M, Y, K) | $T_i$ | | |
| ⋮ | ⋮ | | |
| 753-th COLOR (100,100,100,100) | $T_{753}$ | | |

TWO-DIMENSIONAL EXCITATION CHARACTERISTICS TABLES $T_i$ ($0 \leq i \leq 753$)

FIG.4

TWO-DIMENSIONAL EXCITATION CHARACTERISTICS TABLE Ti (0 ≤ i ≤ 753)

Bi(380,300), Bi(380,310), Bi(380,320), Bi(380,380), Bi(380,390), Bi(380,400), Bi(λ0, λ)

| λ (nm) / λ0 (nm) | 300 | 310 | 320 | ... | 380 | 390 | 400 | ... | 600 | 610 | 620 | ... | 770 | 780 |
|---|---|---|---|---|---|---|---|---|---|---|---|---|---|---|
| 380 | 0 | 0 | 0 | ... | 0.8 | 0 | 0 | ... | 0 | 0 | 0 | ... | 0 | 0 |
| 390 | 0 | 0 | 0 | ... | 0 | 0.8 | 0 | ... | 0 | 0 | 0 | ... | 0 | 0 |
| 400 | 0 | 0 | 0 | ... | 0 | 0 | 0.8 | ... | 0 | 0 | 0 | ... | 0 | 0 |
| ... | ... | ... | ... | ... | ... | ... | ... | ... | ... | ... | ... | ... | ... | ... |
| 600 | 0.3 | 0.3 | 0.3 | ... | 0.3 | 0.3 | 0.3 | ... | 0.8 | 0 | 0 | ... | 0 | 0 |
| 610 | 0.4 | 0.4 | 0.4 | ... | 0.4 | 0.4 | 0.4 | ... | 0.4 | 0.8 | 0 | ... | 0 | 0 |
| 620 | 0.2 | 0.2 | 0.2 | ... | 0.2 | 0.2 | 0.2 | ... | 0.2 | 0.2 | 0.8 | ... | 0 | 0 |
| ... | ... | ... | ... | ... | ... | ... | ... | ... | ... | ... | ... | ... | ... | ... |
| 770 | 0 | 0 | 0 | ... | 0 | 0 | 0 | ... | 0 | 0 | 0 | ... | 0.8 | 0 |
| 780 | 0 | 0 | 0 | ... | 0 | 0 | 0 | ... | 0 | 0 | 0 | ... | 0 | 0.8 |

DIAGONAL LINE OF $\lambda_0 = \lambda$

FIG.5

SPECTRAL RADIATION CHARACTERISTICS TABLE

| LIGHT SOURCE TYPE / INCIDENT LIGHT WAVELENGTHS $\lambda$ (nm) | LIGHT SOURCE (I) | D65 LIGHT SOURCE (II) | XENON LIGHT SOURCE (III) |
|---|---|---|---|
| 300 | 0.0093 | 0.0003 | 0.5200 |
| 310 | 0.0136 | 0.0329 | 0.5680 |
| 320 | 0.0193 | 0.2024 | 0.6230 |
| ⋮ | ⋮ | ⋮ | ⋮ |
| 550 | 0.9291 | 1.0405 | 1.0040 |
| 560 | 1.0000 | 1.0000 | 1.0000 |
| 570 | 1.0718 | 0.9633 | 1.0000 |
| ⋮ | ⋮ | ⋮ | ⋮ |
| 760 | 2.3212 | 0.4642 | 1.1880 |
| 770 | 2.3701 | 0.6681 | 0.9540 |
| 780 | 2.4168 | 0.6338 | 0.7570 |

ENVIRONMENT LIGHT CHARACTERISTICS DATA ARRAY D

FIG.7

SPECTRAL REFLECTION DATA SAVING UNIT

| i-th COLOR (C,M,Y,K) | $\lambda o$ (nm) | | | | |
|---|---|---|---|---|---|
| | 380 | 390 | 400 | ... | 780 |
| 0-th COLOR (0,0,0,0) | Ro(380) | Ro(390) | | | Ro(780) |
| FIRST COLOR (10,0,0,0) | R₁(380) | | | | |
| ⋮ | | | | | |
| 753-th COLOR (100,100,100,100) | R753(380) | | | | |

$Ri(\lambda o)$

FIG.8

COLORIMETRIC MEASUREMENT DATA SAVING UNIT — 12d

| i-th COLOR (C,M,Y,K) | (L, a, b) |
|---|---|
| 0-th COLOR (0,0,0,0) | |
| ⋮ | ⋮ |
| 753-th COLOR (100,100,100,100) | |

FIG.9

OUTPUT PROFILE SAVING UNIT — 12a

| (L, a, b) | (C, M, Y, K) |
|---|---|
| (0, 0, 0) | |
| (1, 0, 0) | |
| ⋮ | ⋮ |

FIG.14

OUTPUT PROFILE STORAGE UNIT  14e

| OUTPUT PROFILE FOR COMBINATION OF PAPER TYPE (I) AND LIGHT SOURCE TYPE (I) | | OUTPUT PROFILE FOR COMBINATION OF PAPER TYPE (I) AND LIGHT SOURCE TYPE (II) | | OUTPUT PROFILE FOR COMBINATION OF PAPER TYPE (I) AND LIGHT SOURCE TYPE (III) | |
|---|---|---|---|---|---|
| (L a b) | (C, M, Y, K) | (L a b) | (C, M, Y, K) | (L a b) | (C, M, Y, K) |
| ⋮ | ⋮ | ⋮ | ⋮ | ⋮ | ⋮ |
| OUTPUT PROFILE FOR COMBINATION OF PAPER TYPE (II) AND LIGHT SOURCE TYPE (I) | | OUTPUT PROFILE FOR COMBINATION OF PAPER TYPE (II) AND LIGHT SOURCE TYPE (II) | | OUTPUT PROFILE FOR COMBINATION OF PAPER TYPE (II) AND LIGHT SOURCE TYPE (III) | |
| (L a b) | (C, M, Y, K) | (L a b) | (C, M, Y, K) | (L a b) | (C, M, Y, K) |
| ⋮ | ⋮ | ⋮ | ⋮ | ⋮ | ⋮ |
| OUTPUT PROFILE FOR COMBINATION OF PAPER TYPE (III) AND LIGHT SOURCE TYPE (I) | | OUTPUT PROFILE FOR COMBINATION OF PAPER TYPE (III) AND LIGHT SOURCE TYPE (II) | | OUTPUT PROFILE FOR COMBINATION OF PAPER TYPE (III) AND LIGHT SOURCE TYPE (III) | |
| (L a b) | (C, M, Y, K) | (L a b) | (C, M, Y, K) | (L a b) | (C, M, Y, K) |
| ⋮ | ⋮ | ⋮ | ⋮ | ⋮ | ⋮ |

FIG.20

EXCITATION CHARACTERISTICS TABLE FOR PRINTING DEVICE 6 — 14f

| i-th COLOR (CMYK) / PAPER TYPE | NORMAL PAPER (I) | GLOSSY PAPER (II) | COATED PAPER (III) |
|---|---|---|---|
| 0-th COLOR (0,0,0,0) | T₀' | | |
| 1-th COLOR (10,0,0,0) | T₁' | | |
| ⋮ | ⋮ | ⋮ | ⋮ |
| 753-th COLOR (100,100,100,100) | T₇₅₃' | | |

FIG.22

INPUT PROFILE SAVING UNIT — 12e

| (C, M, Y, K) | (L, a, b) |
|---|---|
| (0, 0, 0, 0) | |
| ⋮ | ⋮ |
| (100,100,100,100) | |

FIG.21

TWO-DIMENSIONAL EXCITATION CHARACTERISTICS TABLE Ti' (0 ≤ i ≤ 753)

| λ (nm) \ λ₀(nm) | 300 | 310 | 320 | ... | 380 | 390 | 400 | ... | 600 | 610 | 620 | ... | 770 | 780 |
|---|---|---|---|---|---|---|---|---|---|---|---|---|---|---|
| 380 | 0 | 0 | 0 | ... | 0.8 | 0 | 0 | ... | 0 | 0 | 0 | ... | 0 | 0 |
| 390 | 0 | 0 | 0 | ... | 0 | 0.8 | 0 | ... | 0 | 0 | 0 | ... | 0 | 0 |
| 400 | 0 | 0 | 0 | ... | 0 | 0 | 0.8 | ... | 0 | 0 | 0 | ... | 0 | 0 |
| ... | ... | ... | ... | ⋱ | ... | ... | ... | ⋱ | ... | ... | ... | ⋱ | ... | ... |
| 600 | 0.2 | 0.2 | 0.2 | ... | 0.2 | 0.2 | 0.2 | ... | 0.8 | 0 | 0 | ... | 0 | 0 |
| 610 | 0.3 | 0.3 | 0.3 | ... | 0.3 | 0.3 | 0.3 | ... | 0.3 | 0.8 | 0 | ... | 0 | 0 |
| 620 | 0.4 | 0.4 | 0.4 | ... | 0.4 | 0.4 | 0.4 | ... | 0.4 | 0.4 | 0.8 | ... | 0 | 0 |
| ... | ... | ... | ... | ⋱ | ... | ... | ... | ⋱ | ... | ... | ... | ⋱ | ... | ... |
| 770 | 0 | 0 | 0 | ... | 0 | 0 | 0 | ... | 0 | 0 | 0 | ... | 0.8 | 0 |
| 780 | 0 | 0 | 0 | ... | 0 | 0 | 0 | ... | 0 | 0 | 0 | ... | 0 | 0.8 |

Bi(380,300), Bi(380,380), Bi(λ₀, λ)

DIAGONAL LINE OF λ₀ = λ

FIG.25

TWO-DIMENSIONAL EXCITATION CHARACTERISTICS TABLE Ti' (0 ≤ i ≤ 753)

| $\lambda_0$(nm) \ $\lambda$(nm) | 300 | 310 | 320 | ... | 380 | 390 | 400 | ... | 600 | 610 | 620 | ... | 770 | 780 |
|---|---|---|---|---|---|---|---|---|---|---|---|---|---|---|
| 380 | 0 | 0 | 0 | ... | 0.8 | 0 | 0 | ... | 0 | 0 | 0 | ... | 0 | 0 |
| 390 | 0 | 0 | 0 | ... | 0 | 0.8 | 0 | ... | 0 | 0 | 0 | ... | 0 | 0 |
| 400 | 0 | 0 | 0 | ... | 0 | 0 | 0.8 | ... | 0 | 0 | 0 | ... | 0 | 0 |
| ... | ... | ... | ... | ... | ... | ... | ... | ... | ... | ... | ... | ... | ... | ... |
| 600 | 0 | 0 | 0 | ... | 0 | 0 | 0 | ... | 0.8 | 0 | 0 | ... | 0 | 0 |
| 610 | 0 | 0 | 0 | ... | 0 | 0 | 0 | ... | 0 | 0.8 | 0 | ... | 0 | 0 |
| 620 | 0 | 0 | 0 | ... | 0 | 0 | 0 | ... | 0 | 0 | 0.8 | ... | 0 | 0 |
| ... | ... | ... | ... | ... | ... | ... | ... | ... | ... | ... | ... | ... | ... | ... |
| 770 | 0 | 0 | 0 | ... | 0 | 0 | 0 | ... | 0 | 0 | 0 | ... | 0.8 | 0 |
| 780 | 0 | 0 | 0 | ... | 0 | 0 | 0 | ... | 0 | 0 | 0 | ... | 0 | 0.8 |

Bi(380,300), Bi(380,380), Bi(380,390), Bj($\lambda_0,\lambda$)

DIAGONAL LINE OF $\lambda_0 = \lambda$

COLOR CONVERTING APPARATUS AND COLOR CONVERTING METHOD FOR CONVERTING INPUT IMAGE DATA INTO CONVERTED IMAGE DATA

BACKGROUND OF THE INVENTION

1. Field of the Invention

The present invention relates to a color converting apparatus and color converting method for converting input image data into converted image data for a color outputting device.

2. Description of Related Art

In order to reproduce a color by using a color outputting device, such as a printer, equivalent to that indicated by input image data, a color matching process is employed in the process of converting the input image data into control signals for the color outputting device. During the conversion process, in order to attain a color matching, the input image data is converted to device-independent XYZ color quantities (X, Y, Z), and then into Lab color quantities (L*, a*, b*), which are also device-independent.

Conventionally, when an arbitrary object color is produced by a color outputting device, such as a printer, using paper, ink, or another color reproducing media, a set of XYZ color values (X, Y, Z) is defined as indicative of the arbitrary color by the following Equation (1):

$$X = K * \int_{380}^{780} (S(\lambda) * B(\lambda) * x(\lambda)) d\lambda \quad (1)$$

$$Y = K * \int_{380}^{780} (S(\lambda) * B(\lambda) * y(\lambda)) d\lambda$$

$$Z = K * \int_{380}^{780} (S(\lambda) * B(\lambda) * z(\lambda)) d\lambda$$

$$K = 100 \Big/ \int_{380}^{780} (S(\lambda) * y(\lambda)) d\lambda$$

wherein * denotes a multiplication symbol; $S(\lambda)$ denotes a relative spectral power distribution of light with wavelength $\lambda$ incident on the object color; $B(\lambda)$ denotes the spectral reflectance characteristics of the object color for the light with wavelength $\lambda$; $x(\lambda)$, $y(\lambda)$, and $z(\lambda)$ are three sensitivities of the human eye for the wavelength $\lambda$. These three sensitivities $x(\lambda)$, $y(\lambda)$, and $z(\lambda)$ are greater than zero (0) only within the visible range of about 380-700 nm.

A set of Lab color quantities (L*, a*, b*) is defined in terms of the XYZ value set (X, Y, Z) by the following Equation (2).

$$L^* = 116 * (Y/Yn)^{1/3} - 16$$

$$a^* = 500 * \{(X/Xn)^{1/3} - (Y/Yn)^{1/3}\}$$

$$b^* = 200 * \{(Y/Yn)^{1/3} - (Z/Zn)^{1/3}\} \quad (2)$$

wherein Xn, Yn, and Zn are tristimulus values of a perfectly diffuse surface (white). In other words, Xn, Yn, and Zn are tristimulus values defined for the case where incident light is illuminated directly on the human eye. These tristimulus values Xn, Yn, and Zn are defined by Equation (3) below:

$$Xn = K * \int_{380}^{780} (S(\lambda) * x(\lambda)) d\lambda \quad (3)$$

$$Yn = K * \int_{380}^{780} (S(\lambda) * y(\lambda)) d\lambda$$

$$Zn = K * \int_{380}^{780} (S(\lambda) * z(\lambda)) d\lambda$$

In recent years, inkjet printers have become widely used as the color outputting device.

SUMMARY OF THE INVENTION

Frequently, fluorescent matter is incorporated in the ink and paper serving as the color reproducing media of inkjet printers. Fluorescent matter is characteristic in that, when light of a certain wavelength is irradiated on the fluorescent matter, the matter not only excites and reflects light of the same wavelength, but also reflects light of a different wavelength, specifically of a longer wavelength.

The conventional Equation (1) is, however, formulated under the assumption that the object color reflects light having the same wavelength as the incident light, and does not account for the generation of reflected light having a wavelength different from that of the incident light. That is, the spectral reflectance characteristics $B(\lambda)$ merely indicate the ratio of reflected light to incident light, wherein the reflected light has the same wavelength $\lambda$ as the incident light. In fact, Equation (1) itself only describes cases in which both incident light and reflected light have equivalent wavelengths $\lambda$. For this reason, the values X, Y, and Z defined by Equation (1) cannot accurately specify the values of a color having a fluorescent component with excitation characteristics.

Additionally, if the object color contains a fluorescent component, when the spectral wavelength characteristics $S(\lambda)$ of incident light varies due to changes in the light source, the spectral characteristics of the light reflected from the object color will also vary. In other words, when the light source is changed, the color observed for the same object color will appear differently due to the interaction between the spectral wavelength characteristics $S(\lambda)$ of the incident light and the excitation effect of the fluorescent component. However, the conventional equations (1) and (2) are established not taking into account the effects from excitation that is based on the changes of the observation environment light. The Lab color quantities (L*, a*, b*) obtained by the conventional Equation (2) cannot accurately specify the actual color observed.

Hence, the color values X, Y, Z and L, a, b determined by conventional Equations (1)-(3) cannot accurately quantify the object color when the object color has excitation characteristics. It is impossible to accurately reproduce colors using these color quantities, even through color matching.

The problem the same as described above occurs not only when the object color generates reflected light through excitation but also when the object color generates transmitted light through excitation.

The problem the same as described above occurs also when the object color is produced by any other color outputting devices so that the object color generates light (reflected or transmitted light) through excitation having a wavelength different from that of the incident light.

In view of the above-described drawbacks, it is an object of the present invention to provide a color converting apparatus and color converting method that is capable of converting input image data into converted image data that accurately reproduces the input image data by a color outputting device, even when the color outputting device reproduces colors with excitation characteristics by using a fluorescent component or the like that excites incident light.

In order to attain the above and other objects, the present invention provides a color converting apparatus, comprising: an image data inputting portion inputting image data; a color converting portion performing color conversion on the image data to generate converted image data, the color converting portion performing the color conversion by using information on output-end color conversion characteristics, which is determined based on information on excitation characteristics of a color that is outputted by a color outputting device; and a converted image data outputting portion outputting the converted image data.

With this construction, even when the color outputted by the color outputting device excites light of a different wavelength than that of the incident light, the color converting apparatus of the present invention performs color conversion using the output-end color conversion characteristics that account for this excitation. The color outputting device can output colors based on the converted image data that accurately reproduce the input image data.

The color converting portion may include: an input-end color converting portion converting the received image data into color quantity data using input-end color conversion characteristics of the image data; and an output-end color conversion portion converting the color quantity data to converted image output data using the output-end color conversion characteristics.

When the color outputting device outputs a color in response to a color control signal i, the color produces light with a generated light wavelength $\lambda_0$ in response to incidence of light with an incident light wavelength $\lambda$. In this case, a set of excitation characteristics data Bi ($\lambda_0$, $\lambda$) is defined as indicating a ratio of an amount of the light with the wavelength $\lambda_0$ relative to the amount of the light with the wavelength $\lambda$, the generated light wavelength $\lambda_0$ being equal to or different from the incident light wavelength $\lambda$. The information on the excitation characteristics of the color corresponding to the color control signal i may include a plurality of sets of excitation characteristics data Bi ($\lambda_0$, $\lambda$) for a combination of a plurality of incident light wavelengths $\lambda$ and a plurality of generated light wavelengths $\lambda_0$.

According to another aspect, the present invention provides a color converting apparatus, comprising: a color data inputting portion receiving device-independent color data; a color converting portion performing color conversion on the device-independent color data to generate converted image data by using information on output-end color conversion characteristics, which is determined based on information on excitation characteristics of a color that is outputted by a color outputting device; and a converted image data outputting portion outputting the converted image data, wherein the color outputting device outputs a color in response to a color control signal i, the color producing light with a generated light wavelength $\lambda_0$ in response to incidence of light with an incident light wavelength $\lambda$, a set of excitation characteristics data Bi ($\lambda_0$, $\lambda$) being defined as indicating a ratio of an amount of the light with the wavelength $\lambda_0$ relative to the amount of the light with the wavelength $\lambda$, the generated light wavelength $\lambda_0$ being equal to or different from the incident light wavelength $\lambda$, and wherein the information on the excitation characteristics of the color corresponding to the color control signal i includes a plurality of sets of excitation characteristics data Bi ($\lambda_0$, $\lambda$) for a combination of a plurality of incident light wavelengths $\lambda$ and a plurality of generated light wavelengths $\lambda_0$.

When the color outputting device is capable of outputting a plurality of colors according to a plurality of predetermined color control signals i, the output-end color converting portion converts the device-independent color quantity data set into one of the plurality of color control signals. In this case, the information on the output-end color conversion characteristics may be determined based on: the information on the excitation characteristics of the color outputted by the color outputting device, and information on output-end environment characteristics, which indicates an environment on an output end, in which the color outputted by the color outputting device is to be observed. The information on the output-end environment characteristics may include a spectral radiation distribution array indicative of an output-end environment, the spectral radiation distribution array including a plurality of sets of relative spectral radiation characteristics data S($\lambda$) in correspondence with the plurality of incident light wavelengths $\lambda$, each relative spectral radiation characteristics data set S($\lambda$) being indicative of a relative amount of power of light at a corresponding incident light wavelength $\lambda$ in the output-end environment with respect to an amount of power of light at a predetermined incident light obtained in the output-end environment. The output-end color converting portion may convert the device-independent color quantity data set into the one color control signal by using the following relationships:

$$X = K * \int_{generated\ light\ wavelength\ range} \{ (\int_{incident\ light\ wavelength\ range} Bi(\lambda_0, \lambda) * S(\lambda) d\lambda) * x(\lambda_0) \} d\lambda_0,$$

$$Y = K * \int_{generated\ light\ wavelength\ range} \{ (\int_{incident\ light\ wavelength\ range} Bi(\lambda_0, \lambda) * S(\lambda) d\lambda) * y(\lambda_0) \} d\lambda_0,$$

$$Z = K * \int_{generated\ light\ wavelength\ range} \{ (\int_{incident\ light\ wavelength\ range} Bi(\lambda_0, \lambda) * S(\lambda) d\lambda) * z(\lambda_0) \} d\lambda_0,$$

wherein $K = 100 / \int_{incident\ light\ wavelength\ range} S(\lambda) * y(\lambda) d\lambda$, and $x(\lambda_0)$, $y(\lambda_0)$, $z(\lambda_0)$ are the spectral sensitivities X, Y, and Z of the human eye for the light with the wavelength $\lambda_0$.

According to another aspect, the present invention provides a color converting method, comprising the steps of: inputting image data; performing color conversion on the image data to generate converted image data, the color converting step performing the color conversion by using information on output-end color conversion characteristics, which is determined based on information on excitation characteristics of a color that is outputted by a color outputting device; and outputting the converted image data.

According to still another aspect, the present invention provides a color converting program, comprising: a program of inputting image data; a program of performing color conversion on the image data to generate converted image data, the color converting program performing the color conversion by using information on output-end color conversion characteristics, which is determined based on information on excitation characteristics of a color that is outputted by a color outputting device; and a program of outputting the converted image data.

BRIEF DESCRIPTION OF THE DRAWINGS

The above and other objects, features and advantages of the invention will become more apparent from reading the following description of the preferred embodiments taken in connection with the accompanying drawings in which:

FIG. 4 is an explanatory diagram showing a two-dimensional excitation characteristics table stored in the excitation characteristics table of FIG. 3;

FIG. 5 is an explanatory diagram showing a spectral radiation characteristics table stored in a spectral radiation characteristic storage unit in FIG. 2;

FIG. 7 is an explanatory diagram showing a spectral reflection data saving unit in FIG. 2;

FIG. 8 is an explanatory diagram showing a calorimetric measurements data saving unit in FIG. 2;

FIG. 9 is an explanatory diagram showing an output profile saving unit in FIG. 2;

FIG. 14 is an explanatory diagram showing an output profile storage unit storing a plurality of output profiles according to a second embodiment;

FIG. 20 is an explanatory diagram showing another excitation characteristic storage unit storing excitation characteristics tables in the color converting apparatus of the third embodiment;

FIG. 21 is an explanatory diagram showing a two-dimensional excitation characteristics table stored in the excitation characteristics table of FIG. 20;

FIG. 22 is an explanatory diagram showing an input profile saving unit according to the third embodiment;

FIG. 25 is an explanatory diagram showing a two-dimensional excitation characteristics table created in a modification of the third embodiment; and FIG. 26 is an explanatory diagram showing a preferable one-dimensional reflectance table stored in the excitation characteristics table in the modification of the third embodiment.

DETAILED DESCRIPTION OF THE PREFERRED EMBODIMENTS

Figures 1, 3:
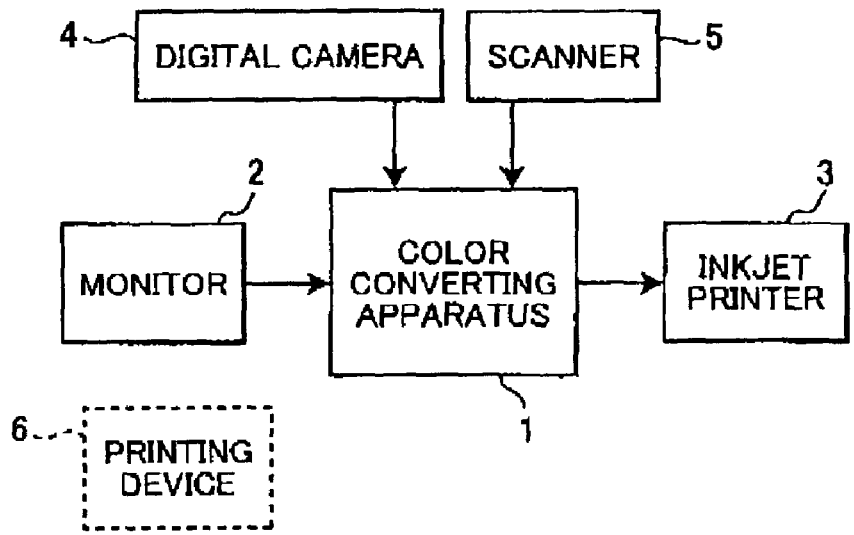
FIG. 1 is a block diagram illustrating how to use a color converting apparatus according to the first embodiment of the present invention.
FIG. 3 is an explanatory diagram showing an excitation characteristics table stored in an excitation characteristic storage unit in FIG. 2.

A color converting apparatus and color converting method according to preferred embodiments of the present invention will be described while referring to the accompanying drawings wherein like parts and components are designated by the same reference numerals to avoid duplicating description.

<First Embodiment>

The color converting apparatus and color converting method according to a first embodiment of the present invention will be described with reference to FIGS. 1-13.

FIG. 1 shows a color converting apparatus 1 according to the preferred embodiment.

The color converting apparatus 1 is connected to a monitor 2 and an inkjet printer 3, and is designed to reproduce colors displayed on the monitor 2 with the inkjet printer 3.

The monitor 2 displays colors based on original data (Rin, Gin, Bin), wherein data Rin, Gin, and Bin included in the original data indicate gradations of the three primary colors.

The color converting apparatus 1 converts the original data (Rin, Gin, Bin) into corrected data (Cout, Mout, Yout, Kout).

The inkjet printer 3 creates an output image based on the corrected data (Cout, Mout, Yout, Kout).

The color converting apparatus 1 of the present embodiment includes a personal computer.

Figure 2:
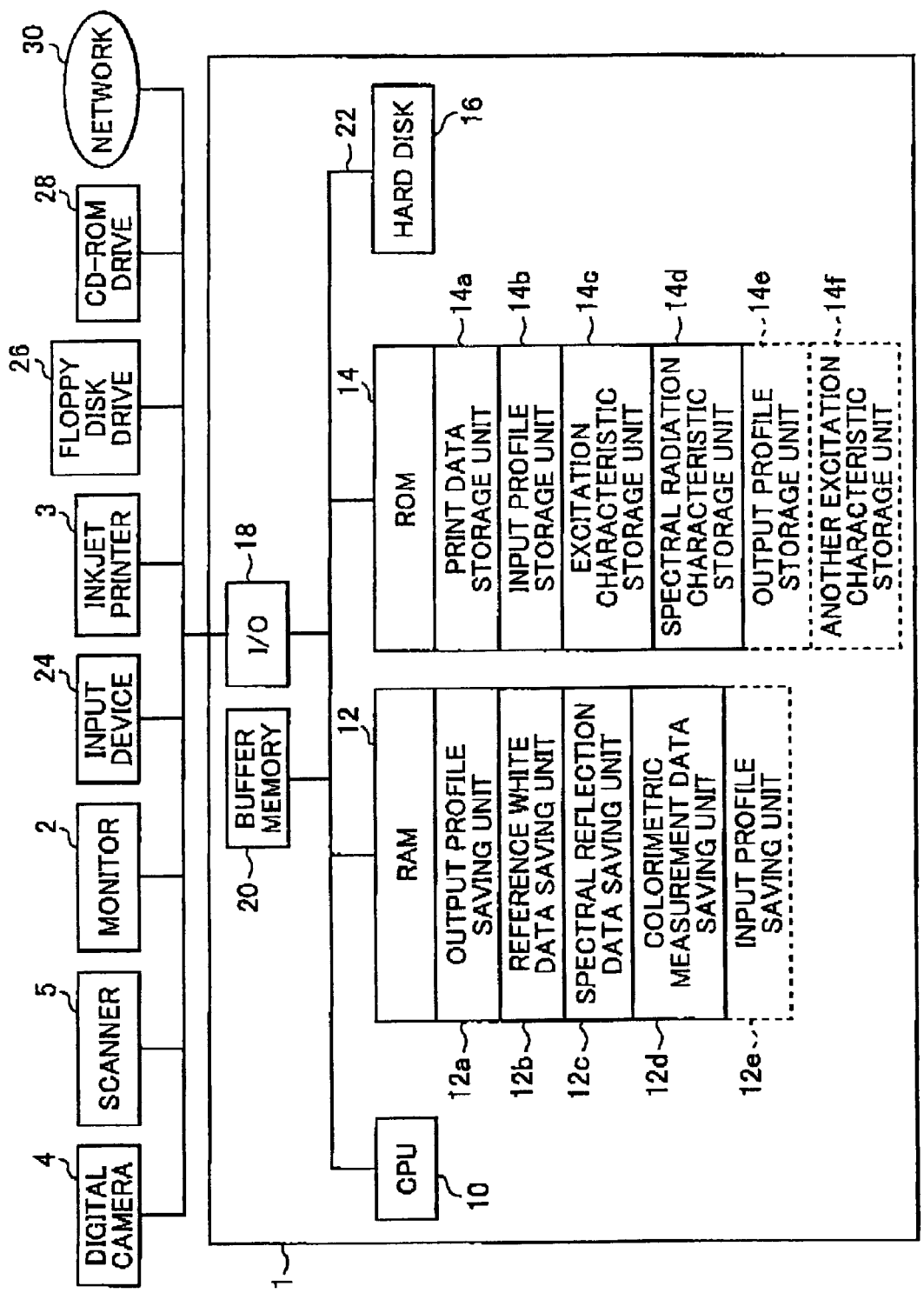
FIG. 2 is a block diagram showing the construction of the color converting apparatus according to the first embodiment.

As shown in FIG. 2, the color converting apparatus 1 includes: a CPU 10, a RAM 12, a ROM 14, a hard disk 16, an input/output (I/O) interface 18, and a buffer memory 20. A bus 22 connects the CPU 10, RAM 12, ROM 14, hard disk 16, I/O interface 18, and buffer memory 20 to one another.

The I/O interface 18 is connected also to an input device 24, such as a keyboard and a mouse, a floppy disk drive 26 ("floppy" is a registered trademark), and a CD-ROM drive 28, as well as the monitor 2 and inkjet printer 3. The I/O interface 18 is further connected to a network 30 of an arbitrary type. When necessary, the I/O interface 18 can be connected also to a digital camera 4 and a scanner 5.

The ROM 14 previously stores therein: a program for the color management system CM and a program for a profile maker PM. These programs may also be stored in the hard disk 16 instead of the ROM 14. It is noted that data of the programs of the color management system CM and the profile maker PM may be originally stored on a computer-readable recording medium, such as a floppy disk or a CD-ROM, and may be installed into the hard disk 16 via the floppy disk drive 26 or the CD-ROM drive 28. Alternatively, data of the programs of the color management system CM and the profile maker PM may be downloaded from the network 30 such as the Internet or the like. The ROM 14 may previously store therein an application program. The application program functions to create desired images.

The ROM 14 is formed with: a print data storage unit 14a, an input profile storage unit 14b, an excitation characteristic storage unit 14c, and a spectral radiation (illumination) characteristic storage unit 14d. These memory areas may be formed on the hard disk 16 rather than the ROM 14.

The buffer memory 20 functions as an input unit 20a (see FIG. 6) for receiving original data (Rin, Gin, Bin) from the application program, and for temporarily saving that data. The buffer memory 20 also functions as an output unit 20b (see FIG. 6) for receiving corrected data (Cout, Mout, Yout, Kout) from a color management system CM, described later, temporarily storing the corrected data, and outputting this data to the inkjet printer 3 via the I/O interface 18 thereafter.

The CPU 10 executes the program for the profile maker PM, stored in the ROM 14 or the hard disk 16, to create an output profile.

The CPU 10 further executes the program for the color management system CM, stored in the ROM 14 or the hard disk 16, to convert original data (Rin, Gin, Bin) into corrected data (Cout, Mout, Yout, Kout). The CPU 10 also controls overall operations of the color converting apparatus 1. For example, the CPU 10 executes the application program.

The RAM 12 is for saving data, which is created by the CPU 10 when the CPU 10 performs calculations while executing the various programs. The RAM 12 is formed with: an output profile saving unit 12a, a reference white data saving unit 12b, a spectral reflection data saving unit 12c, and a calorimetric measurement data saving unit 12d. The output profile saving unit 12a is for saving an output profile which are created by the CPU 10 while the CPU 10 executes the profile maker PM program. The reference white data saving unit 12b, the spectral reflection data saving unit 12c, and the calorimetric measurement data saving unit 12d are for saving reference white color data, spectral reflectance data, and calorimetric measurement data, respectively, all of which are created by the CPU 10 while the CPU 10 executes the profile maker PM program.

The input device 24 enables the user to input various instructions and data. As will be described later, the input device 24 functions as an environment light characteristic input unit 24a and a paper type selecting unit 24b (see FIG. 6). The environment light characteristic input unit 24a is for inputting types of light sources to indicate the environment, in which colors outputted by the inkjet printer 3 will be observed. The paper type selecting unit 24b is for selecting a type of paper, onto which the inkjet printer 3 outputs an image.

Next, the print data storage unit 14a will be described in detail.

Print data is prestored in the print data storage unit 14a. This print data is used by the CPU 10 when the CPU 10 executes the profile maker PM program to create an output profile.

More specifically, the print data storage unit 14a stores 754 sets of control signals (C, M, Y, K) as print data for designating 754 colors i ($0 \leq i \leq 753$). Here, the 754 sets of control signals (C, M, Y, K) are constructed from: 216 sets of control signals (C, M, Y, K), in which CMY have the values of 0, 10, 20, 40, 70, or 100% and K have a value of 0%; 216 sets of control signals (C, M, Y, K), in which CMY have values of 0, 10, 20, 40, 70, or 100% and K has a value of 20%; 125 sets of control signals (C, M, Y, K), in which CMY have the values of 0, 20, 40, 70, or 100% and K has the value of 40%; 125 sets of control signals (C, M, Y, K), in which CMY have the values of 0, 20, 40, 70, or 100% and K has the value of 60%; 64 sets of control signals (C, M, Y, K), in which CMY have the values of 0, 40, 70, or 100% and K has the value of 80%; and 8 sets of control signals (C, M, Y, K), in which CMY have the values of 0 or 100% and K has the value of 100%. For example, print data designating a $0^{th}$ color (brightest color (i=0)) is constructed from one set of minimum control signals (C=0%, M=0%, Y=0%, and K=0%) indicating the color of white paper.

Next, the input profile storage unit 14b will be described.

The input profile storage unit 14b prestores therein an input profile. The input profile is profile data for the monitor 2, and is required for converting the original data (Rin, Gin, Bin) into device-independent Lab data (Lin, ain, bin). In order to convert a set of original data (Rin, Gin, Bin) into a set of Lab data (Lin, ain, bin), the color management system CM first determines a set of luminance values (Sr, Sg, Sb) for the three primary colors indicated by the original data set (Rin, Gin, Bin). Based on the set of these luminance values (Sr, Sg, Sb), the color management system CM determines a set of XYZ values (Xin, Yin, Zin), and subsequently determines a set of Lab data (Lin, ain, bin) based on the XYZ value set (Xin, Yin, Zin).

More specifically, the input profile storage unit 14b prestores: gamma values γr, γg, γb; XYZ values Xr, Yr, Zr for R (red) light on the monitor 2; XYZ values Xg, Yg, Zg for G (green) light on the monitor 2; and XYZ values Xb, Yb, and Zb for B (blue) light on the monitor 2; XYZ values Xn, Yn, Zn for a prescribed reference white color. The gamma values γr, γg, and γb are determined by measuring the monitor 2 in advance. The XYZ values Xr, Yr, Zr, Xg, Yg, Zg, Xb, Yb, Zb are determined also by measuring the monitor 2 in advance.

The color management system CM determines luminance values Sr, Sg, and Sb by calculating the following Equation (4) for the original data Rin, Gin, and Bin:

$$Sr=(Rin/255)^{\gamma r}$$

$$Sg=(Gin/255)^{\gamma g}$$

$$Sb=(Bin/255)^{\gamma b} \quad (4)$$

The color management system CM further determines the XYZ values Xin, Yin, and Zin by calculating the following Equation (5):

$$Xin=Sr*Xr+Sg*Xg+Sb*Xb$$

$$Yin=Sr*Yr+Sg*Yg+Sb*Yb$$

$$Zin=Sr*Zr+Sg*Zg+Sb*Zb \quad (5)$$

wherein the * symbol denotes a multiplication symbol.

The color management system CM further determines the Lab values Lin, ain, and bin by calculating the following Equation (6):

$$Lin^*=116*(Yin/Yn)^{(1/3)}-16,$$

$$ain^*=500*\{(Xin/Xn)^{(1/3)}-(Yin/Yn)^{(1/3)}\},$$

$$bin^*=200*\{(Yin/Yn)^{(1/3)}-(Zin/Zn)^{(1/3)}\} \quad (6)$$

It is noted that details of the values γr, γg, γb, Xr, Yr, Zr, Xg, Yg, Zg, Xb, Yb, Zb, Xn, Yn, and Zn are disclosed in the U.S. Pat. No. 5,835,624, for example.

Next, the excitation characteristic storage unit 14c will be described.

The excitation characteristic storage unit 14c prestores a table of excitation characteristics as shown in FIG. 3.

The excitation characteristics table of FIG. 3 stores therein 754 two-dimensional excitation characteristics tables Ti (where $0 \leq i \leq 753$) for each of three types of paper which can be used by the inkjet printer 3. In this example, the three paper types include: normal paper (type I), glossy paper (type II), and coated paper (type III).

As shown in FIG. 4, each two-dimensional excitation characteristics table Ti (where $0 \leq i \leq 753$) contains a plurality of sets of excitation-reflectance data Bi ($\lambda_0$, $\lambda$). The plurality of sets of excitation-reflectance data Bi ($\lambda_0$, $\lambda$) are arranged in a two-dimensional matrix form in correspondence with combinations of a plurality of incident light wavelengths $\lambda$ and a plurality of reflected light wavelengths $\lambda_0$. The plurality of incident light wavelengths $\lambda$ are set at 10-nm intervals across the entire wavelength range of incident light (from 300 nm to 780 nm). In other words, the plurality of incident light wavelengths $\lambda$ are 300, 310, 320, ..., and 780 nm. The plurality of reflected light wavelengths $\lambda_0$ are set at 10-nm intervals across the entire wavelength range of reflected light (from 380 nm to 780 nm). In other words, the plurality of reflected light wavelengths $\lambda_0$ are 380, 390, 400, ..., and 780 nm. Each excitation-reflectance data set Bi ($\lambda_0$, $\lambda$) is defined to indicate that when light with the incident light wavelength $\lambda$ falls incident on an object color that is produced by some control signal i, the object color reflects light with the reflected light wavelength $\lambda_0$ at a ratio Bi ($\lambda_0$, $\lambda$) indicative of the amount of the reflected light with respect to the amount of the incident light.

The 754 two-dimensional excitation characteristics tables T0-T753 are prepared for each type of paper in a manner as described below.

First, one type of paper is loaded in the inkjet printer 3. Then, 754 color patches are created on the paper based on the 754 sets of print data (C, M, Y, K), indicating 754 colors i ($0 \leq i \leq 753$), stored in the print data storage unit 14a.

Next, a two-dimensional excitation characteristics table Ti is created for the color patch of each color i, where $0 \leq i \leq 753$, by performing the following spectral measurement.

First, a monochromatic light having a wavelength $\lambda$ of 300 nm is irradiated on one color patch i. A spectral sensor is used to measure reflected light at intervals of 10 nm across the entire reflected light wavelength range from 380 nm to 780 nm in order to determine a plurality of excitation-reflectance data sets Bi ($\lambda_0$, $\lambda$), where $\lambda$=300 nm and $\lambda_0$=380, 390, 400, ..., 780 nm. The spectrophotometer CM-3800d (product name) manufactured by Minolta and Nisshin Boseki can be used as the spectral sensor.

Next, a monochromatic light having another wavelength $\lambda$ of 310 nm is radiated on the same color patch i. The same spectral sensor is used to measure reflected light at intervals of 10 nm over the entire reflected light wavelength range from 380 nm to 780 nm in order to determine another plurality of excitation-reflectance data sets Bi ($\lambda_0$, $\lambda$), where $\lambda$=310 nm and $\lambda_0$=380, 390, 400, ..., 780 nm.

In this way, a single color wavelength across the entire wavelength range of incident light 300 nm to 780 nm is irradiated in order progressively in intervals of 10 nm on a color patch of the single color i. The excitation-reflectance data Bi ($\lambda_0$, $\lambda$), where $\lambda$=300, 310, 320, ..., 780 nm and $\lambda_0$=380, 390, 400, ..., 780 nm, is determined by taking spectral measurements of reflected light using the spectral sensor at intervals of 10 nm across the entire wavelength range of reflected light, from 380 nm to 780 nm. As a result, a plurality of sets of excitation-reflectance data Bi ($\lambda_0$, $\lambda$), for the combinations of the plurality of incident light wavelengths $\lambda$ and the plurality of reflected light wavelengths $\lambda_0$, are determined in the form of a two-dimensional matrix, as shown in FIG. 4. This two-dimensional matrix is set as the two-dimensional excitation characteristics table Ti.

By determining a two-dimensional excitation characteristics table Ti for the color patch of each of all the 754 colors i ($0 \leq i \leq 753$) using the method described above, 754 two-dimensional excitation characteristics tables T0-T753 are created for one type of paper.

Similarly, 754 color patches are created for each of other paper types, and the above-described spectral methods are performed for each of the color patches, thereby creating 754 two-dimensional excitation characteristics tables T0-T753 for each of the other paper types. The excitation characteristics table of FIG. 3 is created by arranging the two-dimensional excitation characteristics tables T0-T753 for all paper types, as shown in FIG. 3, and is stored in the excitation characteristic storage unit 14c.

It is noted that a user will select one paper type from among the types I, II, and III, stored in the excitation characteristic storage unit 14c, and input data of this type into the input device 24 (paper type selecting unit 24b) as the paper type to be used by the inkjet printer 3.

Next, the spectral radiation characteristic storage unit 14d will be described.

The spectral radiation characteristic storage unit 14d prestores therein a spectral radiation characteristics table, such as that shown in FIG. 5.

The spectral radiation characteristics table holds data of a plurality of environment light characteristics in which an image outputted by the inkjet printer 3 can be observed. In other words, the spectral radiation characteristics table contains a one-dimensional environment light characteristics data array D for each of a plurality of light source types. In this example, the plurality of light source types include: an A light source (type I), a D65 light source (type II), and a xenon light source (type III), Each environment light characteristics data array D is a relative spectral power distribution, and includes a plurality of sets of relative spectral radiation characteristics data S($\lambda$) in correspondence with a plurality of incident light wavelengths $\lambda$ (300, 310, 320, ..., 780 nm), which are set at intervals of 10 nm across the entire incident light wavelength range from 300 nm to 780 nm. Each data set S($\lambda$) denotes the proportion at which the light source irradiates incident light of the wavelength $\lambda$. In this example, each data set S($\lambda$) is a normalized value for radiation intensity of the light source in the corresponding wavelength $\lambda$, wherein S(560 nm) (radiation intensity of the light source at the wavelength $\lambda$=560 nm) is normalized to 1. In other words, each data set S($\lambda$) is indicative of an amount of power of light with the incident light wavelengths $\lambda$ relative to an amount of power of light with 560 nm. It is noted that S(555 nm) (radiation intensity for the wavelength $\lambda$=555 nm) may be normalized to 1 instead of S(560 nm).

In this way, each environment light characteristics data array D holds a plurality of relative spectral radiation characteristics data sets S($\lambda$) for the same incident light wavelength range (300-780 nm) as that for the incident light wavelength $\lambda$ in the two-dimensional excitation characteristics tables Ti of FIG. 4. It is noted that the environment light characteristics data array D has to hold data S($\lambda$) for at least a wavelength covering the entire range of the incident light wavelengths $\lambda$ possessed by the two-dimensional excitation characteristics tables Ti. The environment light characteristics data array D may hold data S($\lambda$) for additional wavelength ranges that exceed the 300-780 nm wavelength range of the incident light wavelengths $\lambda$ of the tables Ti.

The user will select one of the light source types I, II, and III stored in the spectral radiation characteristic storage unit 14d The user will input the selection information into the input device 24 (environment light characteristic input unit 24a) as the light source used for the environment in which an output image created by the inkjet printer 3 will be observed.

Next, the functions of the profile maker PM and the color management system CM in the color converting apparatus 1 will be described with reference to FIG. 6.

Figure 6:
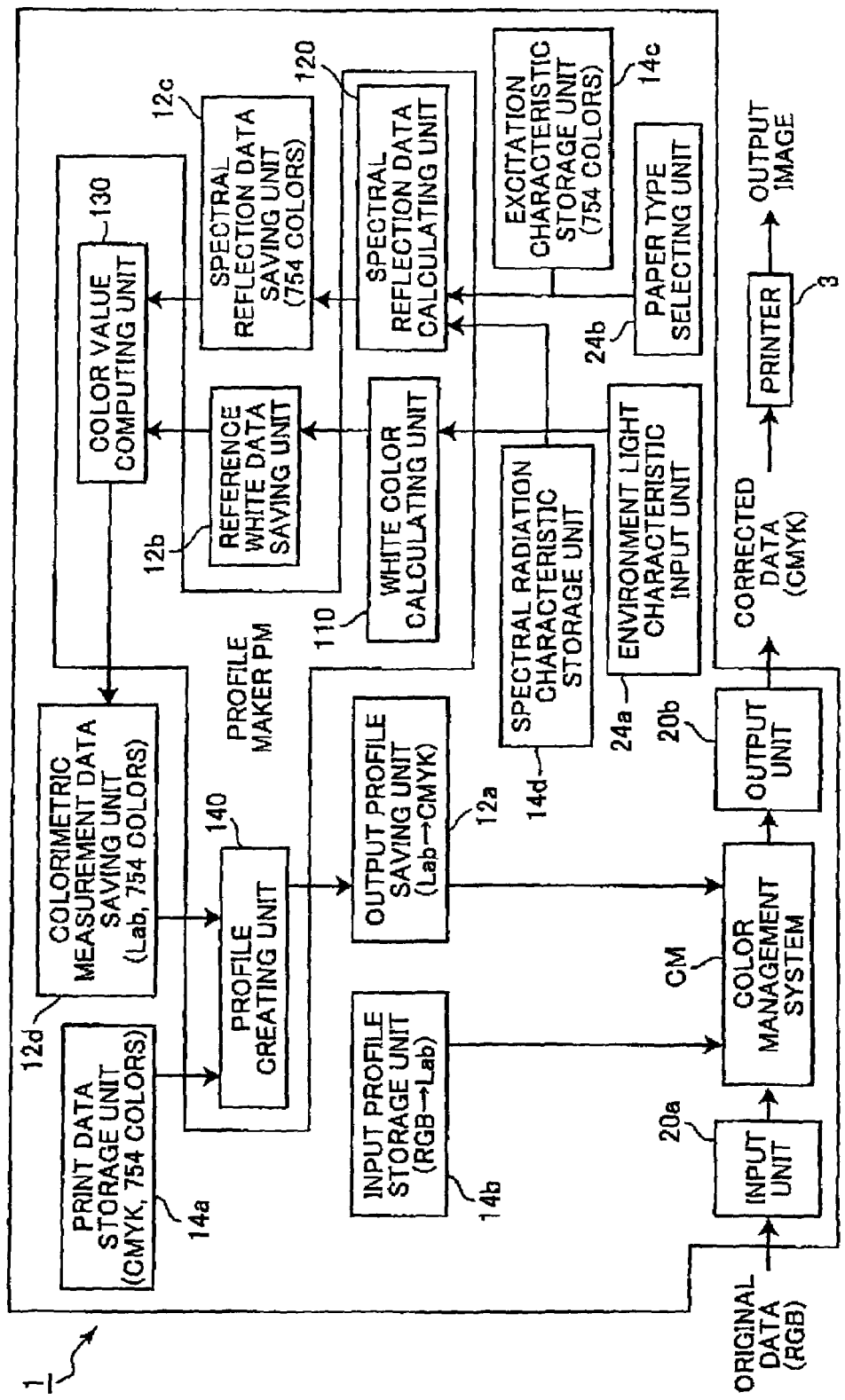
FIG. 6 is a functional block diagram of the color converting apparatus according to the first embodiment.

As shown in FIG. 6, the profile maker PM includes: a white color calculating unit 110, a spectral reflection data calculating unit 120, a color value computing unit 130, and a profile creating unit 140.

The white color calculating unit 110 functions to read a single environment light characteristics data array D from the spectral radiation characteristic storage unit 14d (FIG. 5) in correspondence with the light source type (type I, II, or III) that is inputted into the environment light characteristic input unit 24a by the user. The white color calculating unit 110 then calculates reference white data Xn, Yn, and Zn (tristimulus values of a perfectly diffuse surface) based on the data array D.

More specifically, the white color calculating unit 110 calculates the following Equation (7), using the plurality of sets of data $S(\lambda)$ forming the data array D, to determine the tristimulus values Xn, Yn, and Zn for a perfectly diffuse surface. The white color calculating unit 110 stores these values Xn, Yn, and Zn in the reference white data saving unit 12b.

$$Xn = K * \int_{800}^{780} (S(\lambda) * x(\lambda)) d\lambda \quad (7)$$

$$Yn = K * \int_{800}^{780} (S(\lambda) * y(\lambda)) d\lambda$$

$$Zn = K * \int_{800}^{780} (S(\lambda) * z(\lambda)) d\lambda$$

wherein $x(\lambda)$, $y(\lambda)$, and $z(\lambda)$ are color matching functions, which are defined in Table 2.1 of CIE (Commission Internationale de l'Eclairage) 15.2 (appended table 1 of JIS Z8701) and whose values are set to 0 for wavelengths below 380 nm. Also, K is defined by the following Equation (8):

$$K = 100 \Big/ \int_{800}^{780} (S(\lambda) * y(\lambda)) d\lambda \quad (8)$$

According to Equations (7) and (8), it can be understood that Yn is always 100.

The spectral reflection data calculating unit 120 functions also to read a single environment light characteristics data array D from the spectral radiation characteristic storage unit 14d in correspondence with the light source type (type I, II, or III), which is inputted into the environment light characteristic input unit 24a by the user. The spectral reflection data calculating unit 120 also reads 754 two-dimensional excitation characteristics tables T0-T753 from the excitation characteristic storage unit 14c in correspondence with the paper type (type I, II, or III), which is inputted into the paper type selecting unit 24b by the user.

The spectral reflection data calculating unit 120 calculates a plurality of sets of spectral reflection characteristics data $Ri(\lambda_0)$ for each of the 754 colors (i=0–753) using the data array D and the corresponding table Ti (i=0-753). The plurality of data sets $Ri(\lambda_0)$ are defined for the plurality of reflected light wavelengths $\lambda_0$, which are defined at intervals 10 nm within the range of 380-780 nm.

More specifically, the calculating unit 120 calculates, for each color i (i=0 to 753), the following Equation (9) using: the plurality of data sets Bi $(\lambda_0, \lambda)$ that form the corresponding table Ti, and the plurality of data sets $S(\lambda)$ that form the data array D. By integrating the product of the value $S(\lambda)$ and the value Bi $(\lambda_0, \lambda)$ for one reflected light wavelength $\lambda_0$ with respect to the incident light wavelengths $\lambda$ at 10-nm intervals in the range of 300-780 nm, the calculating unit 120 determines one set of spectral reflection characteristics data $Ri(\lambda_0)$ for the corresponding wavelength $\lambda_0$.

$$Ri(\lambda o) = \int_{800}^{780} (Bi(\lambda o, \lambda) * S(\lambda)) d\lambda \quad (9)$$

In this way, the calculating unit 120 determines, for each color i, a plurality of sets of spectral reflection characteristics data $Ri(\lambda_0)$ for the plurality of reflected light wavelengths $\lambda_0$ (=380, 390, 400, ..., 780 nm) which are defined at 10-nm intervals within the range of 380-780 nm. That is, the calculating unit 120 determines a plurality of data sets $R0(\lambda_0: \lambda_0=380, 390, 400, ..., 780 \text{ nm})$-$R753(\lambda_0: \lambda_0=380, 390, 400, ..., 780 \text{ nm})$ for all the 754 colors. The calculating unit 120 stores all the spectral reflection characteristics data sets $Ri(\lambda_0)$ (here, i=0–753 and $\lambda_0$=380, 390, 400, ..., 780 nm) in the spectral reflection data saving unit 12c, as shown in FIG. 7.

The color value computing unit 130 functions to compute a set of Lab color values (L*, a*, b*) for each of the 754 colors i (i=0–753) based on: the set of reference white color values (Xn, Yn, Zn) that are now stored in the reference white data saving unit 12b, and the spectral reflection characteristics data sets $Ri(\lambda_0)$ for the corresponding color (i=0–753 and $\lambda_0$=380, 390, 400, ..., 780 nm) that are now stored in the spectral reflection data saving unit 12c.

More specifically, the color value computing unit 130 first determines a set of XYZ values (Xi; Yi, Zi) for each color i using the following equation (10):

$$Xi = K * \int_{880}^{780} (Ri(\lambda o) * x(\lambda o)) d\lambda o \quad (10)$$

$$Yi = K * \int_{880}^{780} (Ri(\lambda o) * y(\lambda o)) d\lambda o$$

$$Zi = K * \int_{880}^{780} (Ri(\lambda o) * z(\lambda o)) d\lambda o$$

$$K = 100 \Big/ \int_{800}^{780} (S(\lambda) * y(\lambda)) d\lambda$$

In this way, the computing unit 130 integrates the product of the spectral reflection characteristic value $Ri(\lambda_0)$ and the color matching function ($x(\lambda_0)$, $y(\lambda_0)$, or $z(\lambda_0)$) with respect to the reflected light wavelengths $\lambda_0$ at 10-nm intervals in the range of 380-780 nm, thereby determining the XYZ value Xi, Yi, or Zi.

The computing unit 130 then determines a set of Lab values (L*, a*, b*) for each color i by calculating the following equation (11) based on the set of XYZ values (Xi, Yi, Zi).

$$L^* = 116 * (Yi/Yn)^{(1/3)} - 16,$$

$$a^* = 500 * \{(Xi/Xn)^{(1/3)} - (Yi/Yn)^{(1/3)}\},$$

$$b^* = 200 * \{(Yi/Yn)^{(1/3)} - (Zi/Zn)^{(1/3)}\} \quad (11)$$

wherein values Xn, Yn, and Zn are read from the reference white data saving unit 12b.

It is noted that the computing unit 130 calculates a XYZ values (X0, Y0, Z0) by equation (10) for the $0^{th}$ color control signal (i=0). The $0^{th}$ color control signal is defined by (C=0%, M=0%, Y=0%, K=0%) and represents color of white paper. In order to determine a Lab value set (L*, a*, b*) for the $0^{th}$ color, the computing unit 130 first resets the values Xn, Yn, and Zn, to be used for the calculation of equation (11) for the $0^{th}$ color, into the values X0,Y0, and Z0, respectively. Accordingly, the computing unit 130 will calculate the equation (11) as follows:

$$L* = 116*(Y0/Y0)^{(1/3)} - 16 = 100,$$

$$a* = 500*\{(X0/X0)^{(1/3)} - (Y0/Y0)^{(1/3)}\} = 0,$$

$$b* = 200*\{(Y0/Y0)^{(1/3)} - (Z0/Z0)^{(1/3)}\}.$$

The computing unit 130 will always determines that a Lab value set for the white paper color is equal to a fixed value set (100, 0, 0). Deposition of ink for the white paper color will be always prevented when performing color reproduction. In this way, because it is ensured that L*=100, a*=0, and b*=0 are always maintained for the color control signal i=0 of the brightest color, the color reproducibility for this brightest color control signal i=0 is improved.

It is noted that for colors other than the $0^{th}$ color, the computing unit 130 does not execute the resetting operation for the values Xn, Yn, and Zn, but uses the values Xn, Yn, and Zn as they are read from the reference white data saving unit 12b.

After computing the Lab value sets (L*, a*, b*) for all the 754 colors i ($0 \leq i \leq 753$), the color value computing unit 130 saves these Lab values in the calorimetric measurements data saving unit 12d, as shown in FIG. 8. In this way, the relationship between the CMYK values (C, M, Y, K) for the 754 colors and the Lab values (L, a, b) is determined by the computing unit 130, and stored in the saving unit 12d.

It is noted that as is clear from the above Equations (7)-(11), according to the present embodiment, the value Yi can exceed Yn (100), and the value of L* can exceed 100 contrary to the conventional method.

More specifically, conventionally the value of Y is determined by Equation (1), and the value of L is determined by Equation (2). Because of the equations (1) and (3), Yn is always 100. The value $B(\lambda)$ is defined as the spectral reflectance of an object color, and therefore satisfies the relationship of $0 \leq B(\lambda) \leq 1$. Accordingly, the value Y is always less than or equal to Yn (100), and the value of L is always less than or equal to 100. In order to prevent operation errors due to unforeseen arithmetic errors, therefore, the upper limit of 100 can be defined for the values Y and L*. A limiting process can be executed to determine that an error occurs when Y and L* are determined to exceed 100, then to rematch these values to 100.

Contrarily, according to the present embodiment, the excitation characteristics value Bi ($\lambda_0$, $\lambda$) used in the present embodiment itself is a value between 0 and 1. The spectral reflection characteristic value Ri($\lambda_0$) is the result of taking the integral of the excitation characteristics values Bi ($\lambda_0$, $\lambda$) over the entire incident light wavelength range. According to Equation (9), the value Ri($\lambda_0$) will be always greater than or equal to 0, but can also exceed 1 to indicate excitation. Accordingly, as is clear by Equations (7) and (10), the value Yi can exceed the value Yn, and the value of L* can exceed 100.

Taking into account this specific characteristics of the present embodiment, the color value computing unit 130 does not determine that an error occurs even when the value Yi exceeds the Yn. In other words, the color value computing unit 130 does not execute the above-mentioned limiting process. Additionally, the work area in the RAM 12 for temporarily storing results of calculations is configured to be able to store values of Y that exceed Yn, that is, 100. Similarly, the calorimetric measurements data saving unit 12d is configured to store a value for L greater than 100.

In this way, the present embodiment is established to taking into account that the brightness of reflection light resulting from excitation can be greater than that of the incident light depending on the value of the spectral reflection characteristic data Ri($\lambda_0$). In this way, according to the present embodiment, excitation is taken into account, enabling the values of Y and L* to exceed 100. Hence, the limiting process is eliminated in the present embodiment, allowing the value for L* to exceed 100. The data retaining range is allocated for the data retaining portion (work area in RAM 12) such that the value of Y can be accurately retained even when Y is calculated as a value exceeding Yn and that the value of L* can be accurately retained even when L* exceeds 100. Hence, the process will not generate an overflow error. In this way, it is possible to perform the conversion process even when a value of Y greater than Yn is obtained, without causing an overflow error.

The profile creating unit 140 functions to calculate an output profile based on a correlation between: print data (C, M, Y, K) of 754 colors i ($0 \leq i \leq 753$), stored in the print data storage unit 14a, and Lab color values (L, a, b) for 754 colors, that are now stored in the calorimetric measurements data saving unit 12d. The profile creating unit 140 stores the output profile in the output profile saving unit 12a.

The profile creating unit 140 first determines $101^4$ sets of CMYK print data (C, M, Y, K) for all the $101^4$ colors that include the 754 sets of print data (C, M, Y, K) for 754 colors. The profile creating unit 140 then determines a correlation between CMYK print data and Lab values.

More specifically, the profile creating unit 140 sets one set of print data, which is constructed from an arbitrary CMYK combination other than the print data (C, M, Y, K) of the 754 colors. For example, the profile creating unit 140 sets one set of print data (C=1%, M=0%, Y=0%, K=0%). Next, the profile creating unit 140 calculates a set of Lab values (L, a, b) for this set of print data (C=1%, M=0%, Y=0%, K=0%) by performing an interpolation using the relationship between and the CMYK values (C, M, Y, K) for the 754 colors and the Lab values (L, a, b) for the 754 colors.

The profile creating unit 140 repeats this calculation until all the $101^4$ sets of Lab values (L, a, b) are determined for all the $101^4$ sets of print data (C, M, Y, K). In this way, Lab value sets are determined for all print data sets (C, X, Y, K). As a result, a relationship between (C, M, Y, K) and (L, a, b) is determined. This relationship will be referred to as "(C, M, Y, K)-(L, a, b) relationships" hereinafter.

Subsequently, the profile creating unit 140 determines the reverse correlation of (L, a, b) and (C, M, Y, K) based on the (C, M, Y, K)-(L, a, b) relationship. The reverse correlation of (L, a, b) and (C, M, Y, K) will be referred to as "(L, a, b)-(C, M, Y, K) relationship" hereinafter.

More specifically, the profile creating unit 140 first defines the Lab space in which the L-axis, a-axis, and b-axis are orthogonal to one another. The profile creating unit 140 then defines a plurality of lattice points (L, a, b) by three-dimensionally dividing the Lab space into arbitrary equal intervals. The profile creating unit 140 then selects, for each lattice point (L, a, b), one set of (L, a, b) among all the sets of Lab data (L, a, b) listed in the (C, M, Y, K)-(L, a, b) relationship. The profile creating unit 140 then selects the one set of (L, a, b) that has the minimum color distance (color difference) from the subject lattice point (L, a, b) in the Lab space.

The profile creating unit 140 then reads one set, of CMYK data (C, M, Y, K) that corresponds to the selected Lab data set (L, a, b) from the (C, M, Y, K)-(L, a, b) relationship, and stores this CMYK data in correspondence with the lattice point (L, a, b).

By repeating the above-described operations for all the lattice points (L, a, b), the (L, a, b)-(C, M, Y, K) relationship is created in the form of a three-dimensional lookup table. The profile creating unit 140 stores this three-dimensional lookup table as the output profile in the output profile saving unit 12*a* as shown in FIG. 9.

The color management system CM converts each set of original data (Rin, Gin, Bin), inputted into the buffer memory 20 (input unit 20*a*), into a set of Lab data (Lin, ain, bin) based on the input profile stored in the input profile storage unit 14*b*. The color management system CM subsequently converts the Lab data set (Lin, ain, bin) into a set of corrected data (Cout, Mout, Yout, Kout) based on the output profile which is now stored in the output profile saving unit 12*a*. The color management system CM outputs the corrected data set (Cout, Mout, Yout, Kout) to the inkjet printer 3 via the buffer memory 20 (output unit 20*b*).

It is noted that when performing color conversion on one set of original data (Rin, Gin, Bin), the color management system CM converts this data to a device-independent Lab data set (Lin, ain, bin). The color management system CM converts the data by performing the above Equations (4)-(6) based on the input profile.

Next, the color management system CM converts the Lab data set (Lin, ain, bin) into a corrected data set (Cout, Mout, Yout, Kout) using the output profile (FIG. 9). More specifically, the color management system CM first finds out, in the Lab space, several Lab lattice points (eight lattice points, for example) that surround an input color point that is specified by the Lab data set (Lin, ain, bin). The color management system CM then searches for several sets of CMYK data (C, M, Y, K) that correspond to the several sets of Lab data (L, a, b) at the several Lab lattice points from the output profile. Next, the color management system Cm determines the corrected data set (Cout, Mout, Yout, Kout) corresponding to the inputted Lab data set (Lin, ain, bin) by performing an interpolation calculation based on the several CMYK data sets (C, M, Y, K) searched as described above. Details of this interpolation method is disclosed in the U.S. Pat. No. 5,835,624.

The color management system CM outputs the corrected data (Cout, Mout, Yout, Kout) to the inkjet printer 3 via the buffer memory 20. The user loads paper of the paper type inputted into the paper type selecting unit 24*b* (one of types I, II, or III of FIG. 3) into the inkjet printer 3. Hence, the inkjet printer 3 outputs an output image through a printing process based on the corrected data (Cout, Mout, Yout, Rout) on the paper of the selected paper type. The user views the outputted image under the light source type (one of types I, II, III of FIG. 5) that the user has inputted into the environment light characteristic input unit 24*a*. In this way, the user can observe the output image at the same colors as those displayed by the monitor 2 based on the original data (Rin, Gin, Bin).

The operations of the color converting apparatus 1 having the above configuration will be described below.

A user operates the color converting apparatus 1 to create image data (Rin, Gin, Bin) to be displayed on the monitor 2 by using an image-creating application program. When the user wishes to print out that image on the inkjet printer 3, the user inputs his/her command to start up the profile maker PM. The profile maker PM stores the image data (Rin, Gin, Bin) created by the user in the buffer memory 20.

These operations of the color converting apparatus 1 will be described with reference to the flowchart in FIG. 10.

When the profile maker PM is started, the CPU 10 controls the monitor 2 in S10 to display names of all the light source types (in this example, an A light source, D65 light source, and xenon light source set as types I, II, and III, respectively) stored in the, spectral radiation characteristics table (FIG. 5) in the spectral radiation characteristic storage unit 14*d*. The user is prompted to select one of the displayed light source types.

By manipulating the input device 24, the user selects a light source type that is used in the environment in which the user will view the printed image. For example, the user aligns the cursor with the name of a desired light source on the monitor 2 and clicks the mouse button to select the light source type. In this way, operation of the color converting apparatus 1 is extremely simple, since the user need only select a desired light source.

In S20, the CPU 10 reads a single environment light characteristics data array D, which corresponds to the selected light source type, from the spectral radiation characteristics table (FIG. 5) in the spectral radiation characteristic storage unit 14*d*. The CPU 10 stores the environment light characteristics data array D in a work area (not shown) of the RAM 12.

In S30, the CPU 10 calculates the tristimulus values Xn, Yn, and Zn for a perfectly diffuse surface according to Equations (7) and (8) using a plurality of sets of relative spectral radiation characteristics data $S(\lambda)$ that form the environment light characteristics data array D, which is read in S20 The CPU 10 stores the tristimulus values Xn, Yn and Zn in the reference white data saving unit 12*b* of the RAM 12.

In S40, the CPU 10 controls the monitor 2 to display the names of all paper types (in the present embodiment, normal paper, glossy paper, and coated paper set to types I, II, and III, respectively) stored in the excitation characteristics table (FIG. 3) of the excitation characteristic storage unit 14*c*. The CPU 10 prompts the user to select a single type of paper. By operating the input device 24, the user selects a desired type of paper. That is, the user aligns the cursor with a desired name of paper type on the monitor 2 and clicks the mouse button to select the paper type.

In S50, the CPU 10 reads the 754 two-dimensional excitation characteristics tables T0-T753 corresponding to the selected paper type from the excitation characteristics table (FIG. 3) in the excitation characteristic storage unit 14*c*, and stores the data in a work area of the RAM 12.

In S60, the CPU 10 determines a plurality of sets of spectral reflection characteristic data $Ri(\lambda_0)$, where $0 \leq i \leq 753$ and $\lambda_0 = 380, 390, 400, \ldots, 780$ nm, and stores these values in the spectral reflection data saving unit 12*c*. It is noted that the CPU 10 determines, for each color i ($0 \leq i \leq 753$), a plurality of sets of spectral reflection characteristic data $Ri(\lambda_0$ where $\lambda_0 = 380, 390, 400, \ldots, 780$ nm) by calculating Equation (9) using: the plurality of sets of excitation-reflectance data $Bi(\lambda_0, \lambda)$ in the corresponding two-dimensional excitation characteristics table Ti ($0 \leq i \leq 753$) that has been stored in the work area of the RAM 12 in S50; and the plurality of sets of relative spectral radiation characteristics data $S(\lambda)$ making up the environment light characteristics data array D that has been stored in the work area of the RAM 12 in S20.

In S70, the CPU 10 determines an XYZ value set (Xi, Yi, Zi) for each color i ($0 \leq i \leq 753$) by calculating Equation (10) based on the values Xn, Yn, and Zn that have been stored in the reference white data saving unit lib in S30 and the spectral reflection characteristic data $Ri(\lambda_0)$ ($0 \leq i \leq 753$) that has been stored in the spectral reflection data saving unit 12c in S60. The CPU 10 further determines an Lab value set (L*, a*, b*) for each color i ($0 \leq i \leq 753$) by calculating Equation (11) based on the XYZ value set (X, Y, Z).

It is noted that when performing calculations for the $0^{th}$ color (i=0), the CPU 10 calculates the Equation (11) after determining the XYZ value set (X0, Y0, Z0) and by resetting the values Xn, Yn, Zn to X0, Y0, Z0. Accordingly, the Lab value set for the $0^{th}$ color (i=0) is always fixed at is (100, 0, 0). The CPU 10 will not cause an error during the calculations of S70, even when the calculated value Yi exceeds Yn and the obtained value L* exceeds 100.

In S80, the CPU 10 saves the Lab data sets (L, a, b) calculated in S70 for all the 754 colors as calorimetric measurements data in the calorimetric measurements data saving unit 12d.

In S90, the CPU 10 determines the (C, M, Y, K)-(L, a, b) relationships (that is, correlations between $101^4$ CMYK print data sets and Lab data sets) based on the relationships between the 754 sets of CMYK print data (C, M, Y, K) for 754 colors, which are stored in the print data storage unit 14a, and the 754 sets of Lab data (L, a, b) for the 754 colors, which have been stored in the calorimetric measurements data saving unit 12d in S80.

In S100, the CPU 10 performs an inverse calculation based on the (C, M, Y, K)-(L, a, b) relationships determined in S90, to determine the (L, a, b)-(C, M, Y, K) relationships.

In S110, the CPU 10 stores the three-dimensional lookup table showing the (L, a, b)-(C, M, Y, K) relationships in the output profile saving unit 12a as an output profile.

After the profile maker PM completes its process in this way, the user starts up the color management system CM program and issues an instruction to perform a print operation.

Figure 11:
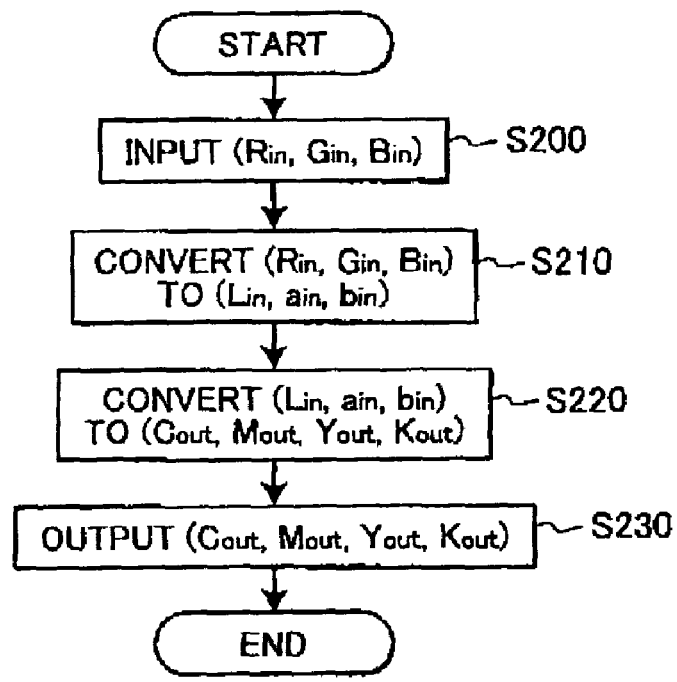
FIG. 11 is a flowchart illustrating the color conversion operations performed by the color management system in the color converting apparatus of the first embodiment.

After the color management system CM starts up, as shown in the flowchart of FIG. 11, the CPU 10 reads each set of original data (Kin, Gin, Bin) from the buffer memory 20 in S200.

In S210, the CPU 10 determines one set of Lab data (Lin, ain, bin) for each set of original data (Rin, Gin, Bin) based on the input profile stored in the input profile storage unit 14b. To do this, the CPU 10 calculates the above Equations (4)-(6) based on each set of original data (Rin, Gin, Bin).

In S220, the CPU 10 converts each set of Lab data (Lin, ain, bin) to a set of corrected data (Cout, Mout, Yout, Kout) by performing interpolation calculation using the output profile now stored in the output profile saving unit 12a.

In S230, the CPU 10 outputs the corrected data (Cout, Mout, Yout, Kout) to the inkjet printer 3 via the buffer memory 20.

The color management system CM process is completed after all the sets of original data (Rin, Gin, Bin) are converted to corrected data (Cout, Mout, Yout, Kout) and outputted.

The inkjet printer 3 produces an output image by performing a printing operation on paper of the paper type selected by the user based on the corrected data (Cout, Mout, Yout, Kout).

In this way, the color converting apparatus 1 of the present embodiment converts image data (Rin, Gin, Bin) to Lab data (Lin, ain, bin) based on the input profile. The color converting apparatus 1 further converts the Lab data (Lin, ain, bin) to corrected data (Cout, Mout, Yout, Kout) based on the output profile. Here, the output profile has been created by calculating Equations (9)-(11) based on: the excitation-reflectance data Bi ($\lambda_0$, $\lambda$) in the two-dimensional excitation characteristics tables Ti that correspond to the paper type used in the inkjet printer 3; and the relative spectral radiation characteristics data $S(\lambda)$ for the light source type used when viewing the outputted image. Accordingly, output images created using corrected data (Cout, Mout, Yout, Kout) will have the same colors as those displayed in the monitor 2 when observed in the observation environment of the light source type selected by the user, even when the created image includes a fluorescent light component.

In the embodiment described above, the original data (Rin, Gin, Bin) is created by the application program on the color converting apparatus 1 to produce images for the monitor 2. The original data (Rin, Gin, Bin) is temporarily stored in the buffer memory 20 before being subjected to color conversion. However, this original data (Rin, Gin, Bin) may not be created by the color converting apparatus 1, but can be prestored on a storage medium, such as a floppy disk or a CD-ROM. In this case, the original data (Rin, Gin, Bin) will be read by the floppy disk drive 26 or the CD-ROM drive 28 and temporarily stored in the buffer memory 20 via the I/O interface 18 for color conversion. It is also possible to perform color conversion after inputting the original data (Rin, Gin, Bin) for the monitor 2 via the I/O interface 18 from the network 30 and temporarily storing the data in the buffer memory 20.

As described above, according to the present embodiment, for each paper type, a plurality of two-dimensional excitation characteristics tables Ti are provided in one to one correspondence with a plurality of colors i. The excitation characteristics table Ti for each color i contains a plurality of sets of excitation-reflectance data Bi ($\lambda_0$, $\lambda$) in a two-dimensional matrix form, for a plurality of combinations of incident light wavelengths $\lambda$ and reflected light wavelengths $\lambda_0$. The excitation-reflectance data Bi ($\lambda_0$, $\lambda$) indicate the ratio of the amount of the reflected light wavelength $\lambda_0$ generated in response to incidence of the incident light wavelength $\lambda$, with respect to the amount of the incident light wavelength $\lambda$. Using the two-dimensional excitation characteristics table Ti corresponding to the user's selected paper type and using the spectral radiation characteristics $S(\lambda)$ of the user's selected light source type, Equations (9)-(11) are calculated to create an output profile, and color conversion is performed by using the output profile.

Next, several modifications of the first embodiment of the present invention will be described.

<First Modification>

In the embodiment described above, the two-dimensional excitation characteristics table Ti (FIG. 4) includes not only the excitation-reflectance data Bi ($\lambda_0$, $\lambda$) for incident light wavelengths $\lambda$ in the visible range from 400-780 nm, but also the excitation-reflectance data Bi ($\lambda_0$, $\lambda$) for incident light wavelengths $\lambda$ in the ultraviolet range smaller than 400 nm.

However, it is sufficient that each excitation-reflectance data set Bi ($\lambda_0$, $\lambda$) is in the form of a two-dimensional data for two wavelengths (reflected wavelength $\lambda_0$ and incident light wavelength $\lambda$) and therefore can contain information on excitation for generating a reflected light wavelength $\lambda_0$ different from the incident light wavelength λ. It is sufficient that the two-dimensional excitation characteristics table Ti be configured to list up the plurality of excitation-reflectance data sets (excitation characteristics data sets) Bi ($\lambda_0$, λ) for the two wavelengths $\lambda_0$ and λ. It is unnecessary that the two-dimensional excitation characteristics table Ti contains the ultraviolet range in the incident light wavelength λ. The two-dimensional excitation characteristics table Ti may be configured from the excitation characteristics data Bi ($\lambda_0$, λ) for incident light wavelengths λ in the visible range from 400-780 nm and for reflected light wavelengths $\lambda_0$ in the visible range from 400-780 nm.

Excitation generally occurs to shift in the longer wavelength, only. Accordingly, the excitation-reflectance data sets Bi ($\lambda_0$, λ), where $\lambda_0 < \lambda$, are normally always zero (0) That is, the excitation-reflectance data sets Bi ($\lambda_0$, λ) in the upper-right region of the two-dimensional excitation characteristics table Ti with respect to the diagonal line ($\lambda_0 = \lambda$) in FIG. 4 are always zero (0) in general. It is therefore sufficient to list up only those excitation-reflectance data sets Bi ($\lambda_0$, λ) for $\lambda_0 \geq \lambda$ in the two-dimensional excitation characteristics table Ti. In other words, the two-dimensional excitation characteristics table Ti (FIG. 4) may list up only those data Bi ($\lambda_0$, λ) that are located on the diagonal line of $\lambda_0 = \lambda$ and on the lower left side of the diagonal line. In this case, it is possible to reduce the amount of data required to be stored in the excitation characteristic storage unit 14*c*.

<Second Modification>

Papers, such as normal paper, glossy paper, and coated paper, reproduce colors by generating a reflected light in response to incident light. However, there are other types of paper that reproduce colors by generating transmitted light in response to incident light. Examples of these paper types include transparencies for use on overhead projectors.

The excitation characteristic storage unit 14*c* (FIG. 3) may be prestored with store 754 two-dimensional excitation characteristics tables T0-T753 for each paper type that generates transmitted light. In this case, excitation characteristics data sets Bi ($\lambda_0$, λ) forming each two-dimensional excitation characteristics table Ti (i=0-753) can be set as transmittance. When some paper type generates transmitted light at a wavelength $\lambda_0$ in response to incidence of incident light at a wavelengths λ, the transmittance indicates a ratio of the amount of the transmitted light at a wavelength $\lambda_0$ with respect to the amount of the incident light at a wavelength λ. A two-dimensional excitation characteristics table Ti for each color i is created by arranging a plurality of excitation-transmittance data sets Bi ($\lambda_0$, λ) two-dimensionally for combinations of a plurality of incident light wavelengths λ and a plurality of transmitted light wavelengths $\lambda_0$.

When printing on a transparency sheet loaded in the inkjet printer 3, in S10 in the process for creating an output profile (FIG. 10), the user can select a type of light source that will illuminate the transparency when using the overhead projector. In S40, the user can select "transparency sheet" as the paper type. The values Ri($\lambda_0$) obtained in S60 by Equation (9) for each color i are indicative of spectral transmission characteristics of the subject color i. Based on the spectral transmission characteristics values Ri($\lambda_0$), the Lab values are calculated in S70 according to Equations (10) and (11).

<Third Modification>

In the embodiment described above, 754 two-dimensional excitation characteristics tables T0-T753 are stored in the excitation characteristic storage unit 14*c*, as shown in FIG. 3, in correspondence with each paper type that can be used in the inkjet printer 3. However, the excitation characteristics vary not only according to types of paper, but also according to types of ink.

In the present modification, therefore, the 754 two-dimensional excitation characteristics tables T0-T753 are stored in the excitation characteristic storage unit 14*c* in correspondence with each of a plurality of combinations of paper types and ink types that can be used in the inkjet printer 3. Each two-dimensional excitation characteristics table Ti ($0 \leq i \leq 753$, FIG. 4) is configured of a plurality of excitation characteristics data sets Bi ($\lambda_0$, λ) for a plurality of incident light wavelengths λ and reflected light wavelengths $\lambda_0$. Each data set Bi ($\lambda_0$, λ) has been determined by producing a color patch by using a corresponding color control signal i and by using a corresponding paper type and a corresponding ink type. A reflectance (or transmittance) of the color patch is measured at a corresponding incident light wavelength λ and at a corresponding reflected light wavelength $\lambda_0$.

Figure 10:
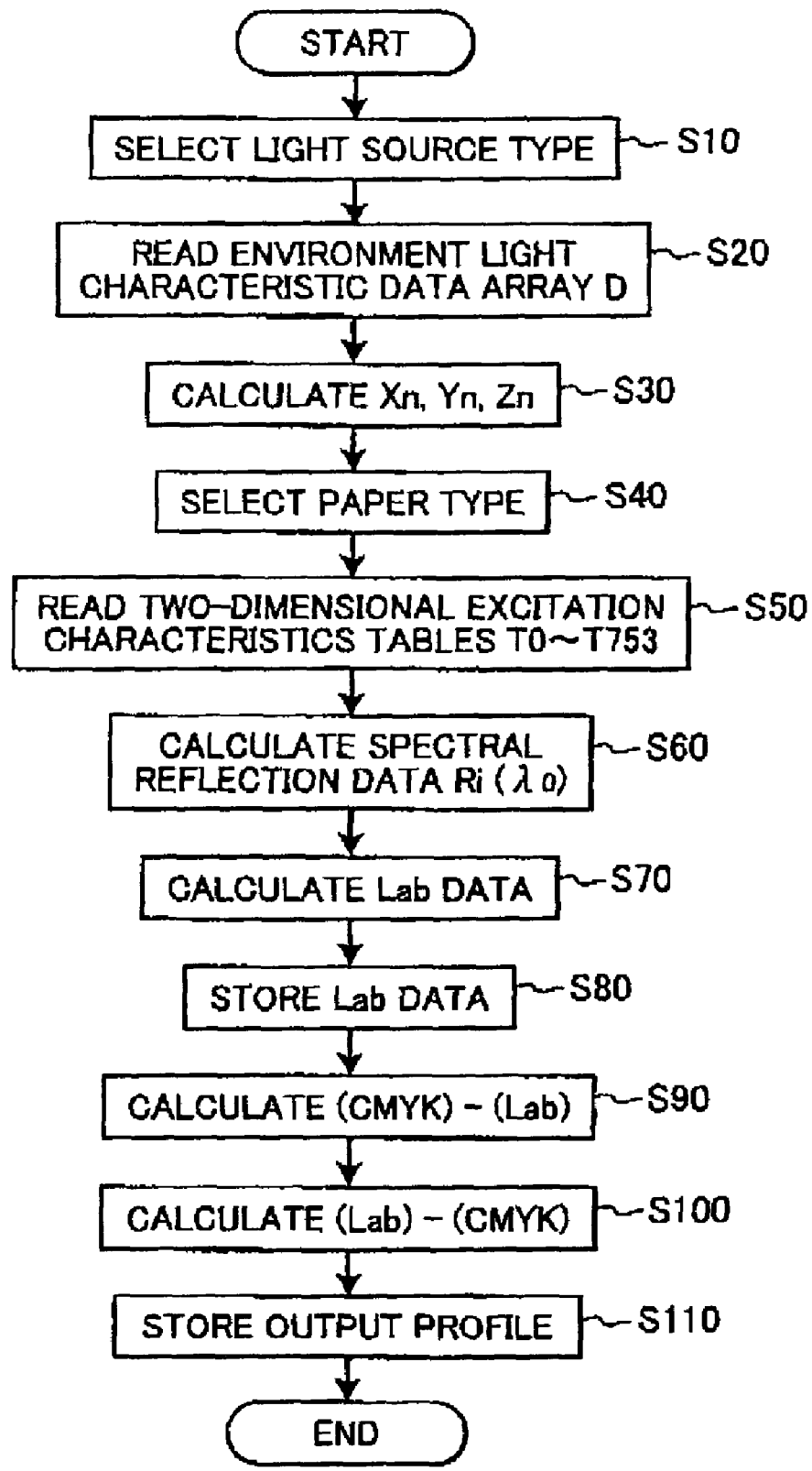
FIG. 10 is a flowchart illustrating the operations that the profile maker performs to create an output profile in the color converting apparatus of the first embodiment.

In this modification, the user selects in S40 of FIG. 10 both of the paper type and ink type to be used in the printing process. In S50, the CPU 10 can select the 754 two-dimensional excitation characteristics tables T0-T753 in correspondence with the combination of the paper type and ink type selected by the user.

<Fourth Modification>

In the embodiment described above, original data (Rin, Gin, Bin) used to drive the monitor 2 is subjected to color conversion. However, original data (Rin, Gin, Bin) produced by other image data handling devices may be subjected to a color conversion process. For example, original data (Rin, Gin, Bin) may be produced by the digital camera 4 or the scanner 5 shown in FIG. 1 and may be inputted into the color converting apparatus 1 for color conversion.

In this case, the input profile storage unit 14*b* is prestored with a three-dimensional lookup table as an input profile. The three-dimensional lookup table includes correlations between a plurality of RGB data sets (R, G, B) and a plurality of Lab data sets (L, a, b). The plurality of RGB data sets (R, G, B) are those that can be inputted from an input-end device (digital camera 4, scanner 5, or the like) to the color converting apparatus 1. The three-dimensional lookup table is created in advance and stored in the input profile storage unit 14*b*.

In the present modification, the buffer memory 20 functions as the input unit 20*a* (see FIG. 6) for receiving and temporarily storing original data (Rin, Gin, Bin) from the digital camera 4 or scanner 5 via the I/O interface 18.

When input data (Rin, Gin, Bin) is inputted from the digital camera 4 or scanner S in S200 of FIG. 11, the color management system CM calculates Lab data (Lin, ain, bin) in S210 by performing an interpolation calculation using the three-dimensional lookup table in the input profile storage unit 14*b*.

<Fifth Modification>

In the embodiment described above, the environment light characteristics data array D is stored in the spectral radiation characteristic storage unit 14*d* for each of the plurality of light source types. Accordingly, the user selects a desired light source in S10 of FIG. 10. In S20, one environment light characteristics data array D is read from the spectral radiation characteristic storage unit 14*d* for the selected light source type.

Figure 12:
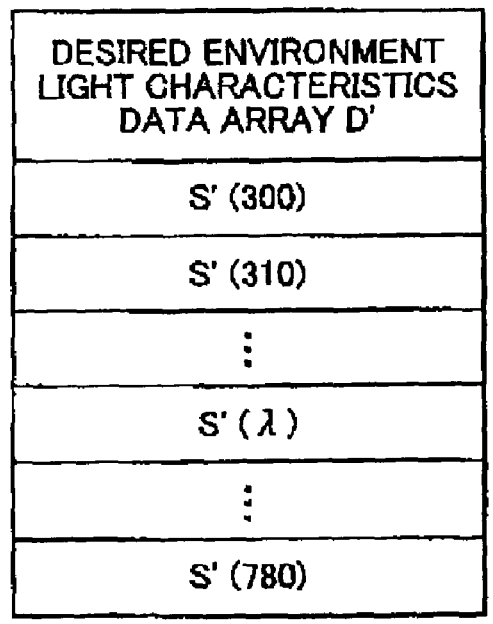
FIG. 12 is an explanatory diagram showing the construction of a desired environment light characteristics data array D' inputted into the color converting apparatus according to a fifth modification of the first embodiment.

In the present modification, however, the user produces a desired environment light characteristics data array D', as shown in FIG. 12. The data array D' is indicative of spectral distribution of light illumination in a desired environment, in which the user will observe images created by the inkjet printer 3. The data array D' includes a plurality of sets of relative spectral radiation characteristics data S'($\lambda$) for the plurality of wavelengths $\lambda$ (300, 310, 320 . . . , 780 nm) within the incident light wavelength range of 300-780 nm. In order to produce each data set S'($\lambda$), the user uses a measuring instrument, such as a spectrophotometer, to actually measure the power of light with wavelength $\lambda$ in the desired environment. Each data set S'($\lambda$) has a value obtained by normalizing the measured radiation intensity of the light with wavelength $\lambda$ so that the a reference data set S'($\lambda$=600 nm or 555 nm) is set to 1.

Figure 13:
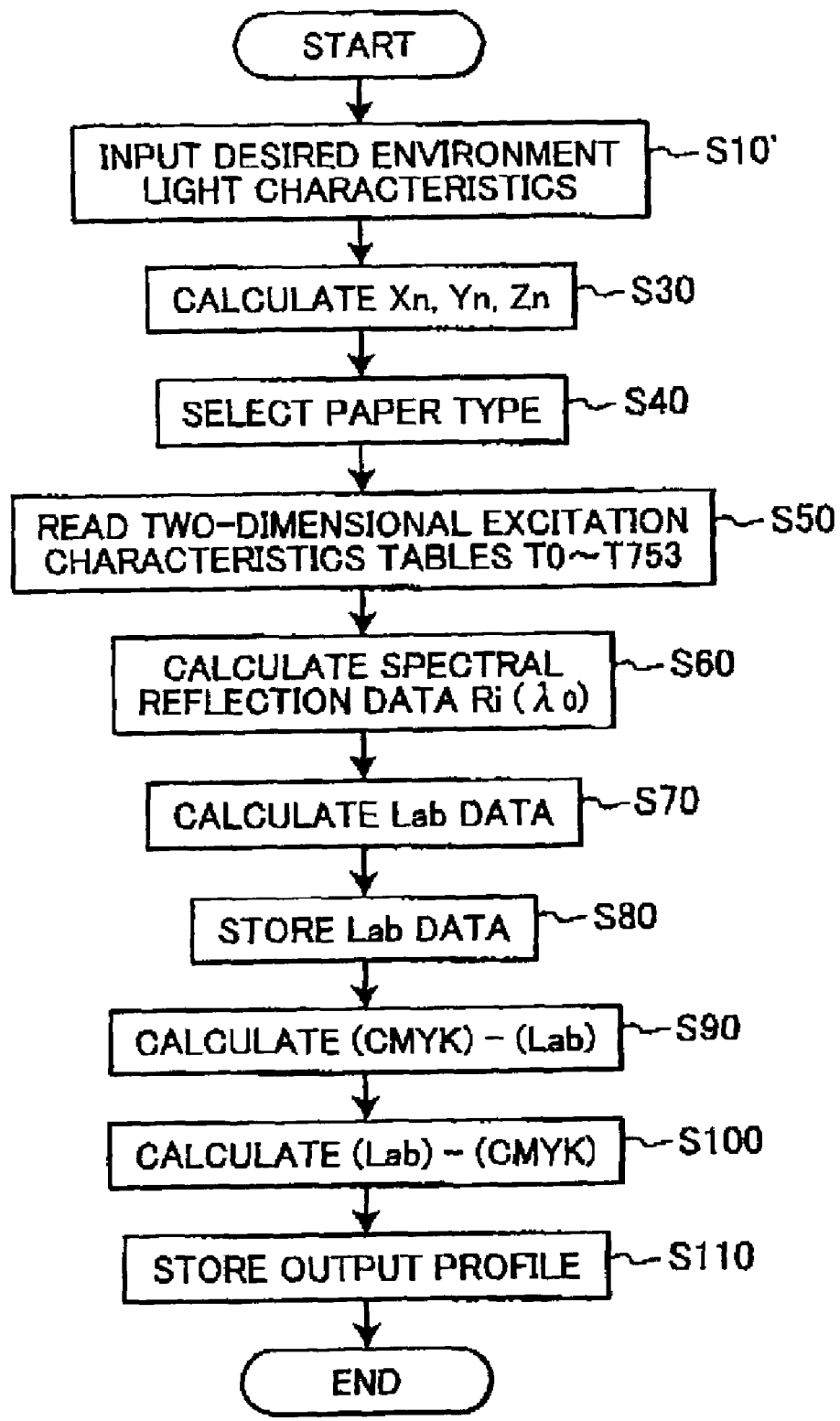
FIG. 13 is a flowchart illustrating the operations that the profile maker performs to create an output profile according to the fifth modification of the first embodiment.

In the present modification, the process of the profile maker PM is modified as shown in FIG. 13 by omitting 520 in FIG. 10 and by providing the process of S10' in place of S10.

As shown in FIG. 13, according to the present modification, in S10', the user inputs his/her desired environment light characteristics data array D' into the color converting apparatus 1. That is, the user inserts a floppy disk or a CD-R storing the prescribed data array D' of FIG. 12 into the floppy disk drive 26 or the CD-ROM drive 28. The CPU 10 drives the floppy disk drive 26 or CD-ROM drive 28, reads the data array D', and stores the data array D' in a work area of the RAM 12. Alternatively, the user can download the data array D' from the network 30 into the work area of the RAM 12. Hence, in the present-modification, the floppy disk drive 26, CD-ROM drive 28, network 30, or the like functions as the environment light characteristic input unit 24a.

Subsequently, the processes of S30-S110 are executed in the same manner as described in the first embodiment. It is noted, however, that when calculating Equation (7) in S30 and Equation (9) in S60, the plurality of sets of relative spectral radiation characteristics data S'($\lambda$) forming the data array D' inputted in S10' is used in place of the relative spectral radiation characteristics data sets S($\lambda$).

In this way, according to this modification, the user can input an array of desired environment data indicating his/her desired output-end observation environment. Accordingly, it is possible to generate converted data that accurately reproduces a color specified by the input data under any desired environment.

<Second Embodiment>

Next, a color converting apparatus and color converting method according to a second embodiment of the present invention will be described with reference to FIGS. 14-18.

In the first embodiment, the user selects an observation environment (light source types I, II, or III in FIG. 5). In response to this selection, the CPU 10 reads a corresponding environment light characteristics data array D from the spectral radiation characteristic storage unit 14d. Further, the user selects a paper type (type I, II, or III in FIG. 3). In response to this selection, the CPU 10 reads corresponding 754 two-dimensional excitation characteristics tables Ti ($0 \leq i \leq 753$) from the excitation characteristic storage unit 14c. The CPU 10 creates an output profile based on a plurality of relative spectral radiation characteristics data sets S($\lambda$) forming the data array D and a plurality of excitation-reflectance data sets Bi ($\lambda_0$, $\lambda$) forming each table Ti. The CPU 10 stores this output profile in the output profile saving unit 12a.

In the present embodiment, however, the ROM 14 is provided with an output profile storage unit 14e, as indicated by the broken line in FIG. 2.

As shown in FIG. 14, the output profile storage unit 14e is prestored with nine output profiles in correspondence with nine combinations of the three light source types (types I, II, and III) and the three paper types (types I, II, and III) that can be selected by the user. Each output profile is a three-dimensional lookup table designating (L, a, b)-(C, M, Y, K) correlations, as is created in the first embodiment (FIG. 9).

These nine output profiles are created in advance for the combinations of light source types and paper types by executing the profile maker PM on another computer that is separate from the color converting apparatus 1. In other words, operations of the profile maker PM (FIG. 10) of the first embodiment are repeatedly executed on the separate computer. Each time the operations of the profile maker PM are executed, the light source type selected in S10 and the paper type selected in S40 are changed in sequence. The plurality of output profiles created in this way are stored in the output profile storage unit 14e in the color converting apparatus 1.

In this way, according to the present embodiment, the color converting apparatus 1 is prestored with all the output profiles that can be used in color conversion. The color converting apparatus 1 does not need to store a program for the profile maker PM. Accordingly, as shown in FIG. 15, the color converting apparatus 1 of the present embodiment is no longer provided with the print data storage unit 14a, spectral radiation characteristic storage unit 14d, excitation characteristic storage unit 14c, reference white data saving unit 12b, spectral reflection data saving unit 12c, and colorimetric measurements data saving unit 12d, all of which are used to create the output profiles in the first embodiment.

Figure 15:
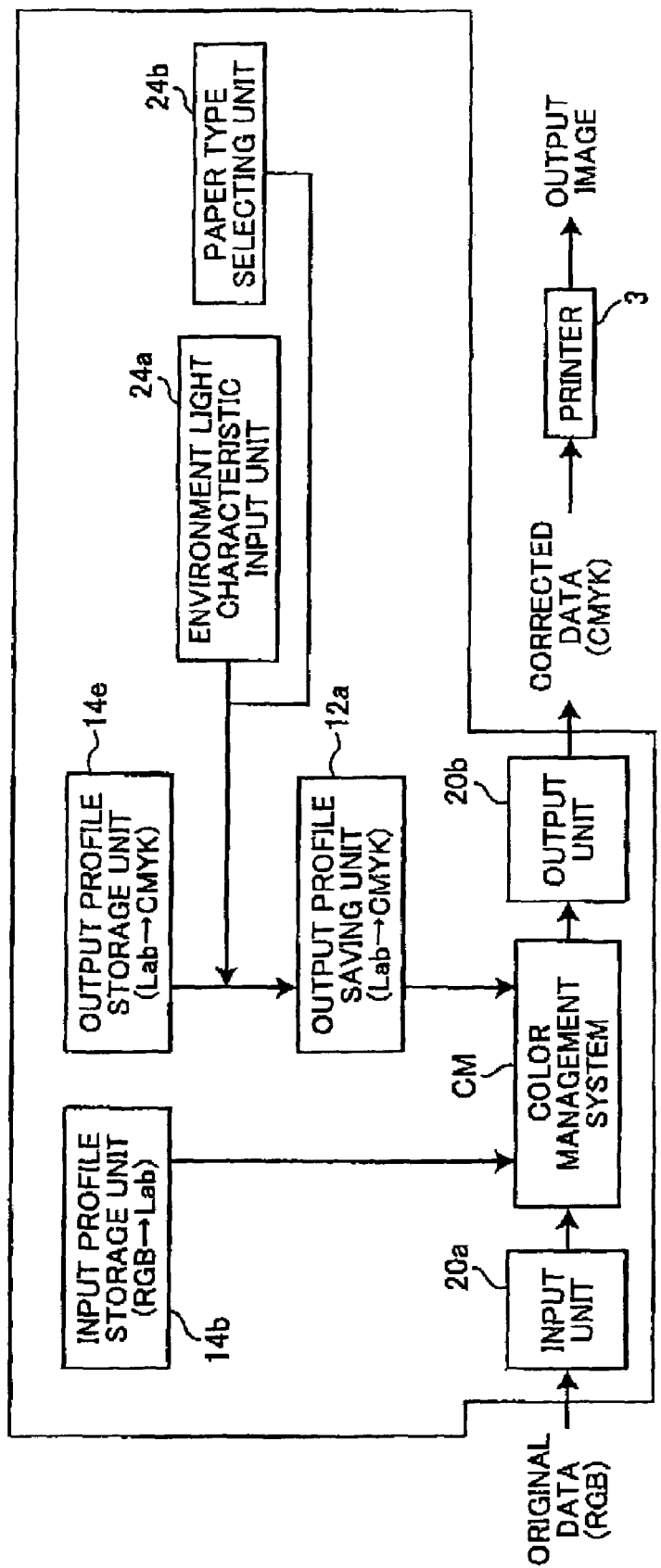
FIG. 15 is a functional block diagram of the color converting apparatus according to the second embodiment.

In the present embodiment, the color management system CM functions as shown in FIG. 15. More specifically, the color management system CM converts the original data (Rin, Gin, Bin) in the buffer memory 20 into Lab data (Lin, ain, bin) based on the input profile. The color management system CM then selects a single output profile from the output profile storage unit 14e (FIG. 14) based on the combination of light source type that the user inputs into the environment light characteristic input unit 24a and the paper type selected by the user with the paper type selecting unit 24b. The color management system CM stores the output profile read from the output profile storage unit 14e in the output profile saving unit 12a. The color management system CM then converts the Lab data (Lin, ain, bin) into corrected data (Cout, Mout, Yout, Kout) based on the output profile now stored in the output profile saving unit 12a. The color management system CM outputs the corrected data to the inkjet printer 3 via the buffer memory 20 (output portion 20b).

The operation of the color converting apparatus 1 of the present embodiment will be described in greater detail with reference to FIG. 16.

When the user wishes to use the inkjet printer 3 to print image data (Rin, Gin, Bin) created and displayed on the monitor 2, the user starts the color management system CM. The image data (Rin, Gin, Bin) is inputted into the buffer memory 20.

Figure 16:
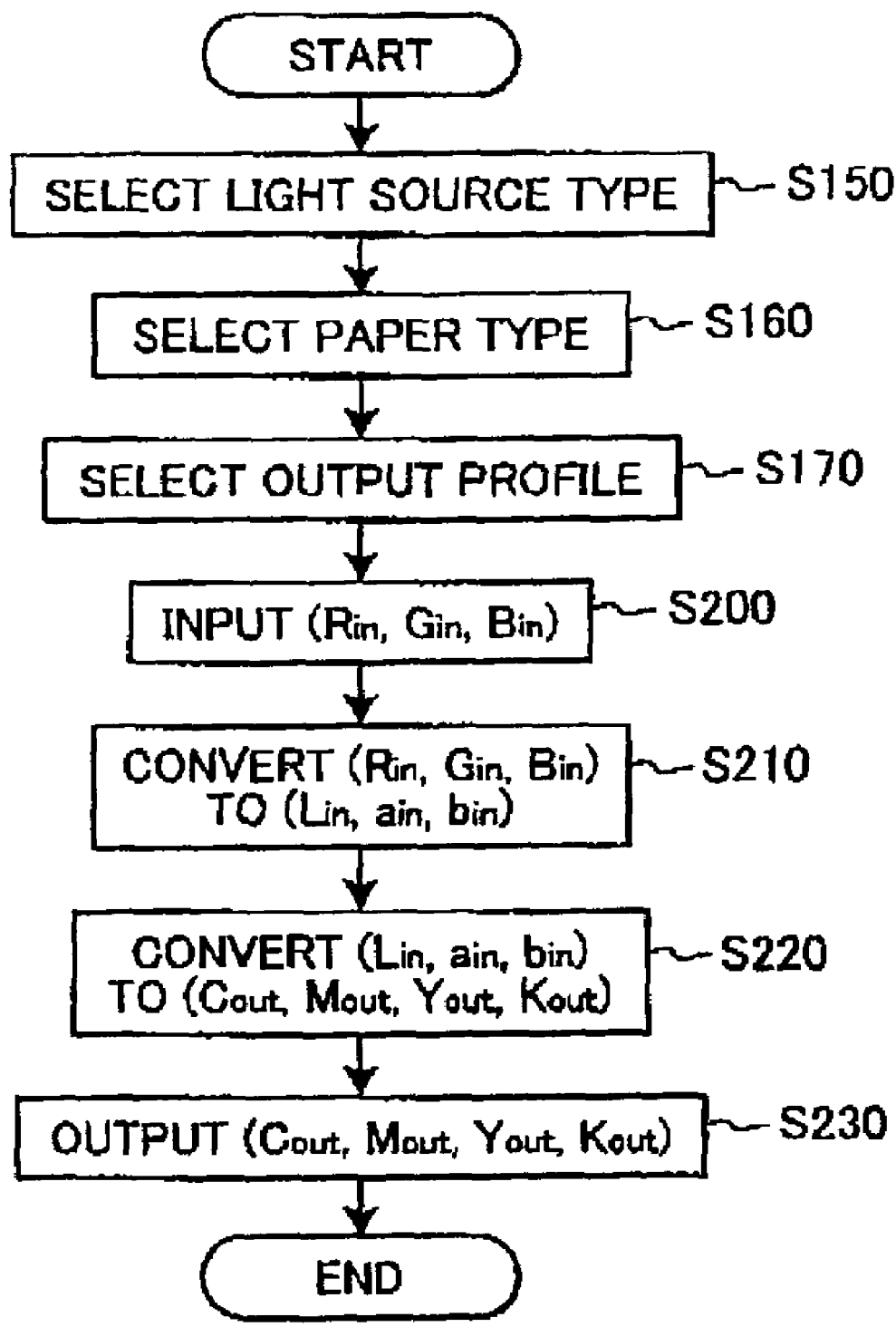
FIG. 16 is a flowchart illustrating the color conversion operations performed by the color management system in the color converting apparatus of the second embodiment.

After the color management system CM is started, the CPU 10 controls the monitor 2 in S150 of FIG. 16 to display names of the three light source types (A light source, D65 light source, and xenon light source set as types I, II, and III, respectively) that correspond to all the nine output profiles stored in the output profile storage unit 14e (FIG. 14). The color management system CM then prompts the user to select a single light source type. The user manipulates the input device 24 to select a light source type that will be used in the environment in which the user views the outputted image.

In S160, the CPU 10 controls the monitor 2 to display names of the three paper types (normal paper, glossy paper, and coated paper set as types I, II, and III, respectively) that correspond to all the nine output profiles stored in the output profile storage unit 14e (FIG. 14). The CPU 10 prompts the user to select a single paper type The user operates the input device 24 to select a desired paper type.

In S170, the CPU 10 reads, from the output profile storage unit 14e, a single output profile that corresponds to the combination of the light source selected in S150 and the paper type selected in S160, and stores the output profile in the output profile saving unit 12a.

Subsequently, color conversion is performed by executing the processes of S200-S230 similarly to the process (FIG. 11) of the first embodiment.

According to the color converting apparatus 1 of the present embodiment, the entire color conversion operation can be performed extremely quickly, since an output profile corresponding to the combination of light source and paper type selected by the user can be simply selected. Moreover, the selected output profile is created in advance by performing Equations (9)-(11) based on: the excitation-reflectance data Bi $(\lambda_0, \lambda)$ in the two-dimensional excitation characteristics tables Ti corresponding to the user-specified paper type, and the relative spectral radiation characteristics data $S(\lambda)$ for the user's specified light source type. Accordingly, when the corrected data (Cout, Mout, Yout, Kout) obtained based on the output profile is used to create an output image on the user's specified paper type, the output image will appear to have the same colors as that displayed on the monitor 2 when observed in an environment having the user's specified light source, even when the output image contains a fluorescent component.

Next, modifications of the second embodiment will be described.

<First Modification>

Figure 17:
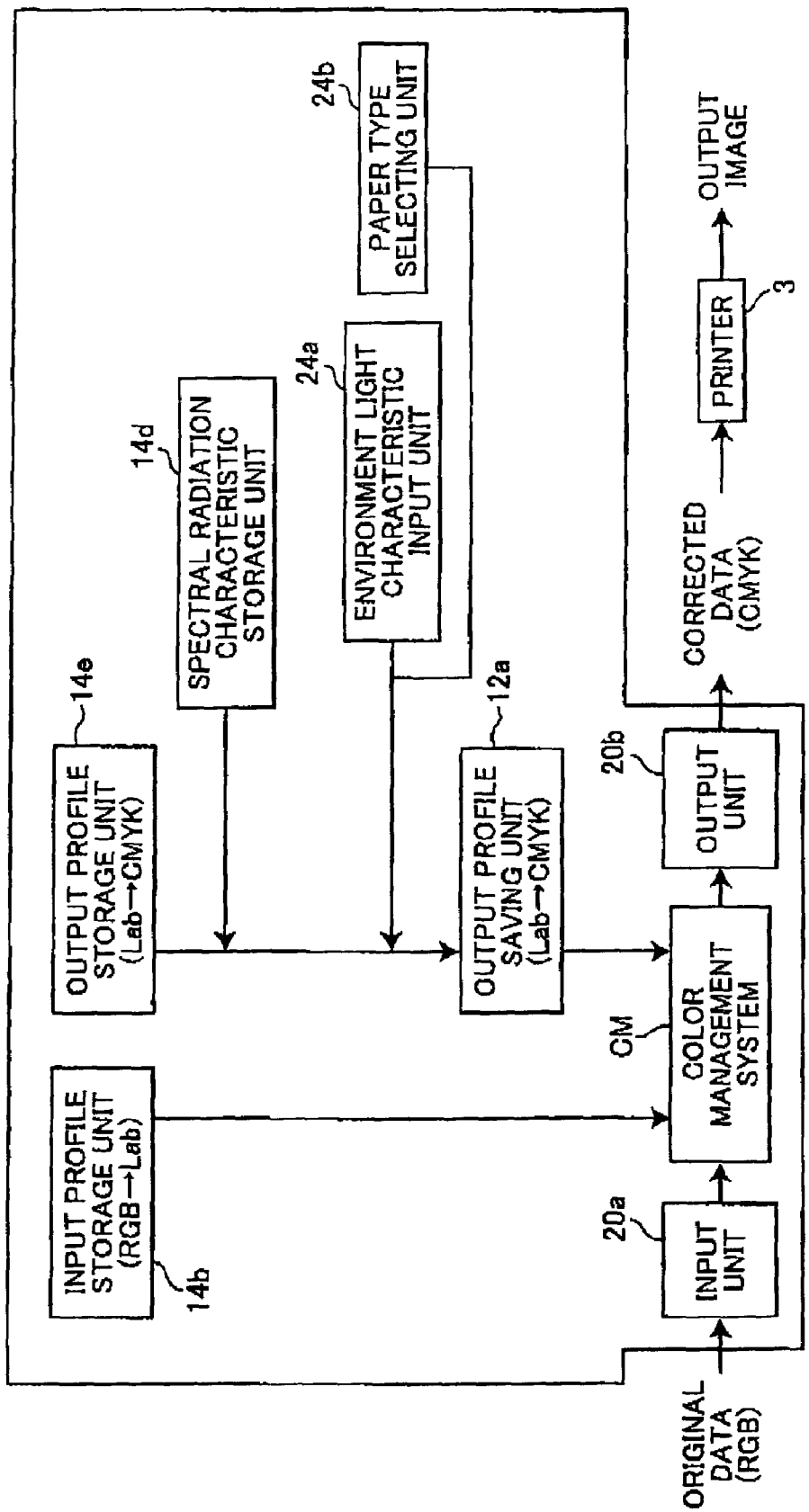
FIG. 17 is a functional block diagram of the color converting apparatus according to a first modification of the second embodiment.

In the second embodiment described above, the print data storage unit 14a, spectral radiation characteristic storage unit 14d, excitation characteristic storage unit 14c, reference white data saving unit 12b, spectral reflection data saving unit 12c, and calorimetric measurements data saving unit 12d used to create the output profiles are omitted from the color converting apparatus 1, as shown in FIG. 15. In the present modification, however, the spectral radiation characteristic storage unit 14d is retained in the color converting apparatus 1, as shown in FIG. 17. The spectral radiation characteristic storage unit 14d is prestored with the environment light characteristics data arrays D for the three light source types I, II, and II, as shown in FIG. 5.

As in the fifth modification of the first embodiment, according to this modification, the floppy disk drive 26, CD-ROM drive 28, network 30, or the like of the present modification functions as the environment light characteristic input unit 24a for inputting the desired environment light characteristics data array D' (FIG. 12) that is created by the user through actual measurements.

In the present modification, the color management system CM functions as shown in FIG. 17.

That is, the color management system CM converts the original data (Rin, Gin, Bin) inputted into the buffer memory 20 into Lab data (Lin, ain, bin) based on the input profile.

The color management system CM selects, from among the plurality of environment light characteristics data arrays D in the spectral radiation characteristic storage unit 14d (see FIG. 5), one data array D that indicates the environment characteristics closest to the data array D' that the user has inputted into the environment light characteristic input unit 24a.

More specifically, the color management system CM determines, for each wavelength $\lambda$ (300, 310, 320, . . . , 780 nm) in the incident light wavelength range (300-780 nm), the difference between a data set $S'(\lambda)$ in the inputted data array D' (FIG. 12) and a data set $S(\lambda)$ in one data array D in the storage unit 14d (FIG. 5). The color management system CM calculates the total sum of differences by adding together the differences for all the wavelengths $\lambda$ of 300, 310, 320, . . . , 780 nm.

The color management system CM performs the above-described calculation for each of all the three data arrays D stored in the storage unit 14d (FIG. 5). In this way, the color management system CM calculates., the total sum of differences between the desired data array D' and a data array D for light source I; the total sum of differences between the desired data array D' and a data array D for light source II; and the total sum of differences between the desired data array D' and a data array D for light source III.

The color management system CM then selects, as a data array that is closest to the data array D', one data array D having the smallest total sum of differences among the three data arrays D. The color management system CM then determines a light source type that corresponds to the selected data array D.

Next, the color management system CM reads, from the output profile storage unit 14e (FIG. 14), one output profile that corresponds to the combination of the selected light source type and the paper type selected by the user with the paper type selecting unit 24b. The color management system CM stores the output profile in the output profile saving unit 12a.

The color management system CM then converts the Lab data (Lint ain, bin) to corrected data (Cout, Mout, Yout, Kout) based on the output profile now stored in the saving unit 12a. The color management system CM outputs this corrected data to the inkjet printer 3 via the buffer memory 20.

The operation of the color converting apparatus 1 according to the present modification will be described below in greater detail with reference to FIG. 18.

In S140, the user inputs the user's desired environment light characteristics data array D' into the color converting apparatus 1. That is, the user inserts a floppy disk or a CD-R that stores the data array D' into the floppy disk drive 26 or the CD-ROM drive 28. The CPU 10 drives the floppy disk drive 26 or CD-ROM-drive 28 to store the data array D' in a work area of the RAM 12. Alternatively, the CPU 10 can download the data array D' into the work area of the RAM 12 from the network 30.

In S150', the CPU 10 selects one environment light characteristics data array D that is closest to the inputted data array D' from the spectral radiation characteristic storage unit 14d (FIG. 5), and determines a corresponding light source type.

In S160, as in the second embodiment, the CPU 10 prompts the user to select a paper type. The user selects a paper type.

In S170, the CPU 10 reads from the output profile storage unit 14e a single output profile that corresponds to the combination of the light source type selected in S150 and the paper type selected in S160, and stores the output profile in the output profile saving unit 12a Subsequently, steps S200-

S230 are executed to perform color conversion, in the same manner as described in the first embodiment.

In this way, the color converting apparatus 1 of the present modification can perform extremely quick color conversion, since the apparatus need only select an output profile for one light source type the most similar to the environment characteristics inputted by the user.

<Second Modification>

The output profile storage unit 14e (FIG. 14) may be prestored with a plurality of output profiles corresponding to a combination of all ink types, all paper types, and all light source types by taking into account a plurality of ink types as in the third modification of the first embodiment. In this case, the user selects both a paper type and ink type in S160 of FIG. 16. In S170, the CPU 10 can select an output profile corresponding to a combination of the light source type selected by the user in S150 and the paper type and ink type selected in S160

<Third Embodiment>

Next, a color converting apparatus and color converting method according to a third embodiment of the present invention will be described with reference to FIGS. 19-26.

The color converting apparatus 1 according to the third embodiment functions to create on the inkjet printer 3 color samples of printed materials that are to be created using a printing device 6 shown by the broken line in FIG. 1.

More specifically, the printing device 6 produces printed materials by using the original data (Cin, Min, Yin, Kin). The color converting apparatus 1 according to the present embodiment converts the original data (Cin, Min, Yin, Kin) into corrected data (Cout, Mout, Yout, Kout) so that the inkjet printer 3 will create the same colors as the printed materials by using the corrected data (Cout, Mout, Yout, Rout).

In this case, the user can store original data (Cin, Min, Yin, Kin), to be inputted to the printing device 6, on a data storing medium, such as a floppy disk or CD-R. The user inserts this floppy disk or CD-R into the floppy disk drive 26 or CD-ROM drive 28 of the color converting apparatus 1 (FIG. 2). The original data (Cin, Min, Yin, Kin) is read and stored in the buffer memory 20 via the I/O interface 18.

Alternatively, the user can input the original data (Cin, Min, Yin, Kin) into the color converting apparatus 1 from the network 30. This original data (Cin, Min, Yin, Kin) is read and stored in the buffer memory 20 via the I/O interface 18.

In this way, the buffer memory 20 functions as the input unit 20a (see FIG. 19) for receiving the original data (Rin, Gin, Bin) via the I/O interface 18 from the floppy disk drive 26, the CD-ROM drive 28, or a type of network 30. The buffer memory 20 temporarily stores the original data (Rin, Gin, Bin).

Next, the portions of the color converting apparatus 1 according to the present embodiment differing from the first embodiment will be described.

Figure 19:
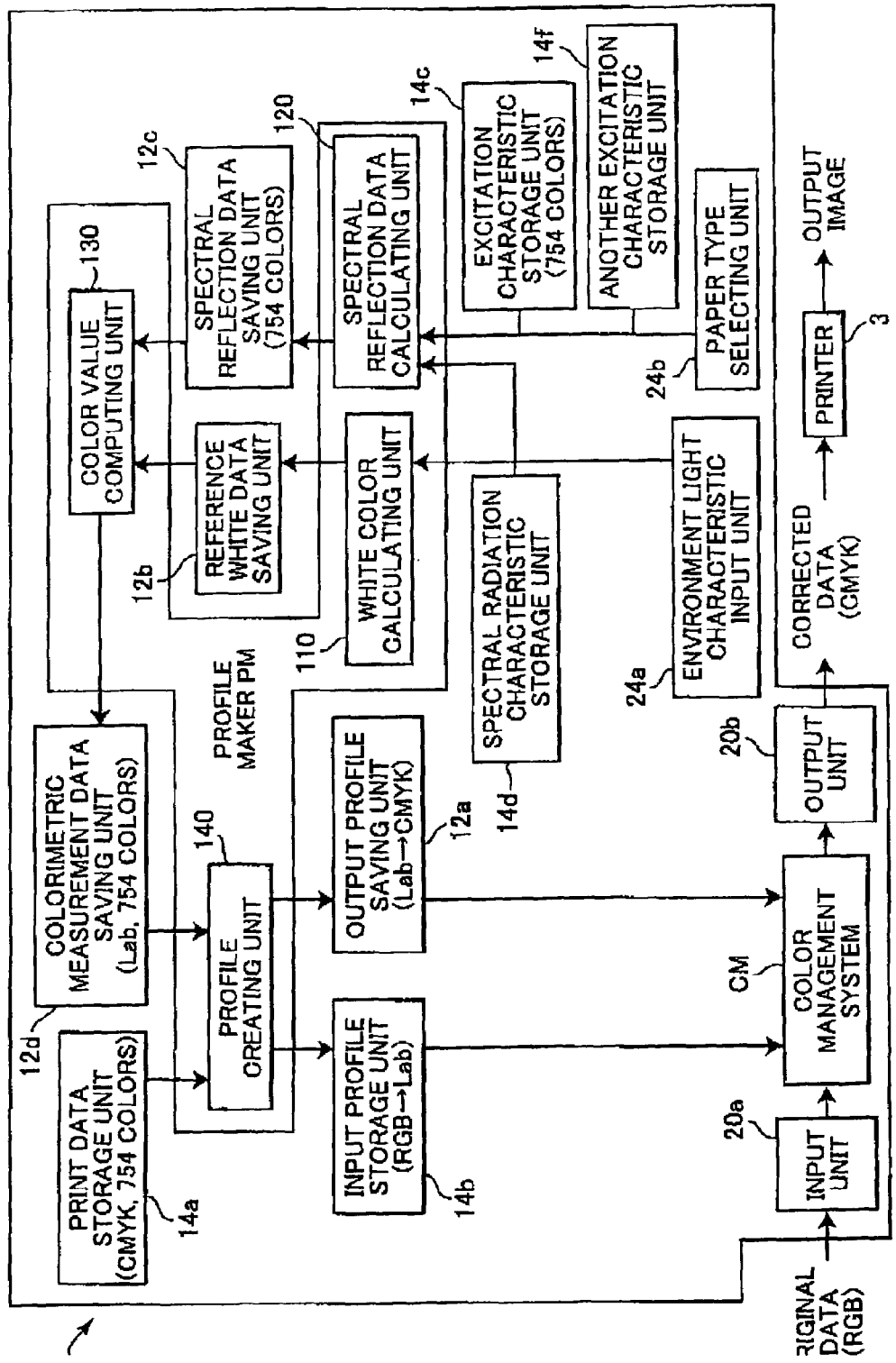
FIG. 19 is a functional block diagram of the color converting apparatus according to a third embodiment.

As shown in FIG. 19, the profile maker PM of the present embodiment not only creates an output profile, but also an input profile. Therefore, the ROM 14 is not provided with the input profile storage unit 14b. Instead, the RAM 12 is provided with an input profile saving unit 12e as indicated by the broken lines in FIG. 2. The input profile is created by the profile maker PM, and then is stored in the input profile saving unit 12e.

In the present embodiment, in addition to the excitation characteristic storage unit 14c, another excitation characteristic storage unit 14f is formed in the ROM 14, as shown in FIG. 2. As shown in FIG. 20, 754 two-dimensional excitation characteristics tables T0'-T753' are prestored in the excitation characteristic storage unit 14f in correspondence with all paper types used by the printing device 6 (in the present embodiment, normal paper, glossy paper, and coated paper set as types I, II, and III, respectively).

As shown in FIG. 21, one two-dimensional excitation characteristics table Ti' ($0 \leq i \leq 753$) corresponding to each paper type used in the printing device 6 contains a plurality of sets of excitation-reflectance data Bi ($\lambda_0, \lambda$). Similarly as in the first embodiment, the two-dimensional excitation characteristics table Ti' ($0 \leq i \leq 753$) contains a plurality of data sets Bi ($\lambda_0, \lambda$) in correspondence with combinations of a plurality of incident light wavelengths $\lambda$ and a plurality of reflected light wavelengths $\lambda_0$. The plurality of incident light wavelengths $\lambda$ are defined at 10-nm intervals within the incident light wavelength range of 300-780 nm, and the plurality of reflected light wavelengths $\lambda_0$ are defined at 10-nm intervals within the reflected light wavelength range of 380-780 nm.

It is noted that in the first embodiment, the 754 two-dimensional excitation characteristics tables T0-T753 (FIG. 3) for the inkjet printer 3 are created in advance for each paper type used on the inkjet printer 3. That is, the inkjet printer 3 is driven to produce 754 color patches on each corresponding paper type based on the 754 sets of print data (C, M, Y, K), and measurements are taken of these color patches. Similarly, the 754 two-dimensional excitation characteristics tables T0'-T753' for the printing device 6 are created in advance for each paper type used on the printing device 6. The tables T0'-T753' for the printing device 6 are created according to the same method used to create the tables T0-T753 for the inkjet printer 3. That is, the inkjet printer 3 is driven to produce 754 color patches on each corresponding paper type based on the 754 sets of print data (C, M, Y, K), and measurements are taken of these color patches.

In the present embodiment, the environment light characteristic input unit 24a not only functions for inputting a type of light source indicating the environment in which color samples outputted by the inkjet printer 3 will be observed, but also functions for inputting a type of light source indicating the environment in which printed materials outputted by the printing device 6 will be observed.

Similarly, the paper type selecting unit 24b not only functions for selecting a type of paper used on the inkjet printer 3 for outputting color samples, but also functions for selecting a type of paper used for outputting printed materials on the printing device 6.

As in the first embodiment, the white color calculating unit 110, spectral reflection data calculating unit 120, color value computing unit 130, and profile creating unit 140 serve to create an output profile in the present embodiment. However, these components also function to create an input profile in the present embodiment, in a manner as described below.

The white color calculating unit 110 functions to read, from the spectral radiation characteristic storage unit 14d (FIG. 5), a single environment light characteristics data array D that corresponds to the light source type (type I, II, or III) to be used when viewing printed materials created on the printing device 6. It is noted that the light source type is designated at the environment light characteristic input unit 24a by the user,. The white color calculating unit 110 calculates white reference values Xn, Yn, and Zn according to Equation (7) based on the relative spectral radiation characteristics data sets S(λ) in the data array D. The white reference values Xn, Yn, and Zn are saved in the reference white data saving unit 12b.

The spectral reflection data calculating unit 120 functions to read, from the spectral radiation characteristic storage unit 14d, the single environment light characteristics array D that corresponds to the light source type (type I, II, or III) to be used when viewing printed materials created on the printing device 6. It is noted that the light source type is inputted into the environment light characteristic input unit 24a by the user. The spectral reflection data calculating unit 120 reads, from the other excitation characteristic storage unit 14f (FIG. 20), 754 two-dimensional excitation characteristics tables T0'-T753' that correspond to the paper type (type I, II, or III) to be used in the printing device 6. It is noted that the paper type is designated at the paper type selecting unit 24b by the user. Equation (9) is used to calculate the spectral reflection characteristic values Ri(λ) (i=0–753 and $\lambda_0$=380, 390, 400, . . . , 780 nm) for 754 colors i (i=0–753) based on the relative spectral radiation characteristics data sets S(λ) in the data array D and the excitation-reflectance data sets Bi ($\lambda_0$, λ) in the 754 tables T0'-T753'. The spectral reflection characteristic values Ri($\lambda_0$) are saved in the spectral reflection data saving unit 12c as shown in FIG. 7.

The color value computing unit 130 functions to compute the Lab color values (L*, a*, b*) for the 754 colors using Equations (10) and (11) based on; the reference white color values Xn, Yn, Zn that are now stored in the reference white data saving unit 12b, and the spectral reflection characteristic values Ri($\lambda_0$) (i=0–753 and $\lambda_0$=380, 390, 400, . . . , 780 nm) for the 754 colors that are now stored in the spectral reflection data saving unit 12c. The Lab color values (L*, a*, b*) for the 754 colors are stored in the calorimetric measurement data saving unit 12d.

The profile creating unit 140 functions to create a correlation between all the $101^4$ colors of CMYK print data and Lab data in the form of a four-dimensional lookup table. The correlation is established based on the relationship between print data (C, M, Y, K) of 754 colors i (0≦i≦753) stored in the print data storage unit 14a and Lab color values (L*, a*, b*) for the 754 colors stored in the colorimetric measurements data saving unit 12d. The profile creating unit 140 stores data of this correlation as an input profile in the input profile saving unit 12e, as shown in FIG. 22.

Except for the description given above, the color converting apparatus 1 of the present embodiment has the same configuration as the color converting apparatus 1 in the first embodiment.

Next, the operations of the color converting apparatus 1 according to the present embodiment having the construction described above will be described.

It is noted that prior to printing with original data (Cin, Min, Yin, Kin) on the printing device 6, the user would like to create samples of the printed material on the inkjet printer 3 and to let a person requesting the printed material (hereinafter referred to as "client") to check the state of colors. In such a case, before creating samples of the printed material, the user first starts the profile maker PM. It is noted that the original data (Cin, Min, Yin, Kin) is read from a floppy disk or the like and stored in the buffer memory 20.

Once the profile maker PM is started, the CPU 10 first creates an input profile according to substantially the same method used in the first embodiment to create the output profile.

Figure 23:
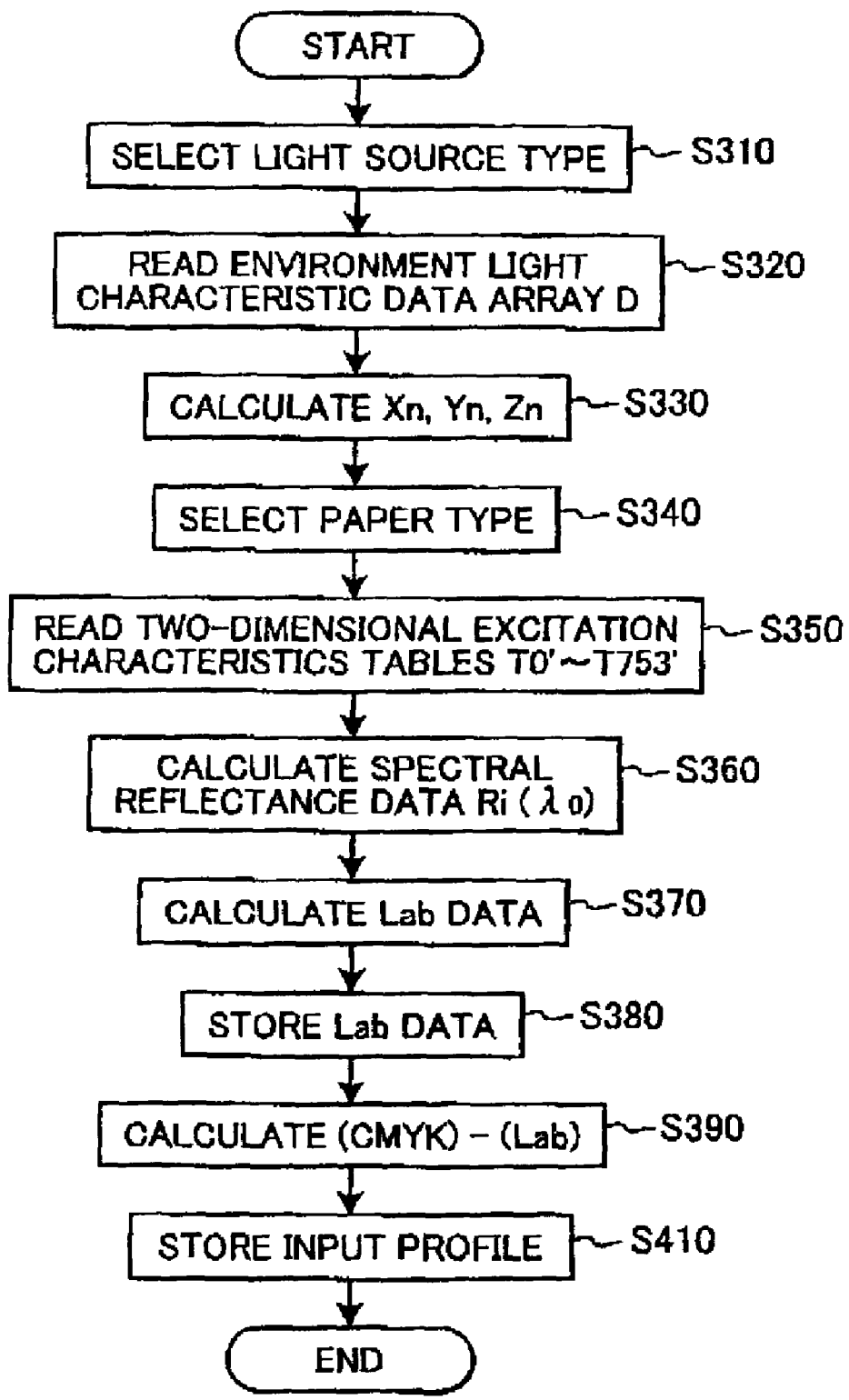
FIG. 23 is a flowchart illustrating the operations that the profile maker performs to create an input profile in the color converting apparatus of the third embodiment.

More specifically, as shown in FIG. 23, the CPU 10 prompts the user in S310 to select a light source type for the environment in which printed material created on the printing device 6 will be observed, just as in step S10 of the first embodiment (FIG. 10).

In S320, as in S20, the environment light characteristics data array D of the selected light source type is read from the spectral radiation characteristic storage unit 14d (FIG. 5) and stored in a work area of the RAM 12.

In S330, as in S30, Equation (7) is used to calculate the tristimulus values Xn, Yn, and Zn of a perfectly diffuse surface based on the plurality of data sets S(λ) forming the data array D of the selected light source type.

In S340, as in S40, the CPU 10 prompts the user to select a type of paper to be used by the printing device 6.

In S350, as in S50, the CPU 10 reads the 754 two-dimensional excitation characteristics tables T0'-T753' (Ti' (0≦i≦753)) that correspond to the paper type selected by the user from the other excitation characteristic storage unit 14f (FIG. 20) and stores these tables Ti' (0≦i≦753) in the work area of the RAM 12.

In S360, as in S60, the CPU 10 uses Equation (9) to calculate the spectral reflection characteristic values Ri($\lambda_0$) based on the plurality of data sets Bi ($\lambda_0$, λ) that make up the tables Ti' (0≦i≦753)) now stored in the RAM 12, and saves the result in the spectral reflection data saving unit 12c as shown in FIG. 7.

In S370-S380, as in S70-S80, the CPU 10 calculates the XYZ values (Xi, Yi, Zi) and the Lab values (L*, a*, b*) for each color i according to Equations (10) and (11) and stores the results in the colorimetric measurements data saving unit 12d as shown in FIG. 8

In S390, as in S90, the CPU 10 calculates Lab value sets corresponding to all the $101^4$ sets of CMYK data that include the 754 CMYK print data in the print data storage unit 14a. The CPU 10 creates correlations between all the $101^4$ CMYK data sets (C, X, Y, K) and the corresponding $101^4$ Lab data sets (L, a, b) in the form of a 4-dimensional lookup table. Unlike the first embodiment, the reverse calculation of S100 (FIG. 10) is not executed in the present embodiment.

Accordingly, the program proceeds directly from S390 to S410. In S410, the CPU 10 stores, as an input profile, all the $101^4$ CMYK data sets (C, M, Y, K) and their corresponding $101^4$ Lab data sets (L, a, b) determined in S390 in the colorimetric measurements data saving unit 12d as shown in FIG. 22.

After creation of the input profile is complete, the CPU 10 creates an output profile according to the operations in the same manner as in the first embodiment (FIG. 10).

It is noted that according to the present embodiment, the user selects in S10 the light source type that will be used in the environment in which the client will view the sample created by the inkjet printer 3. In S40, the user selects a paper type that will be used for creating the sample on the inkjet printer 3.

After creating the output profile, the profile maker PM process ends, as in the first embodiment, and the color management system CM process is initiated.

Figure 24:
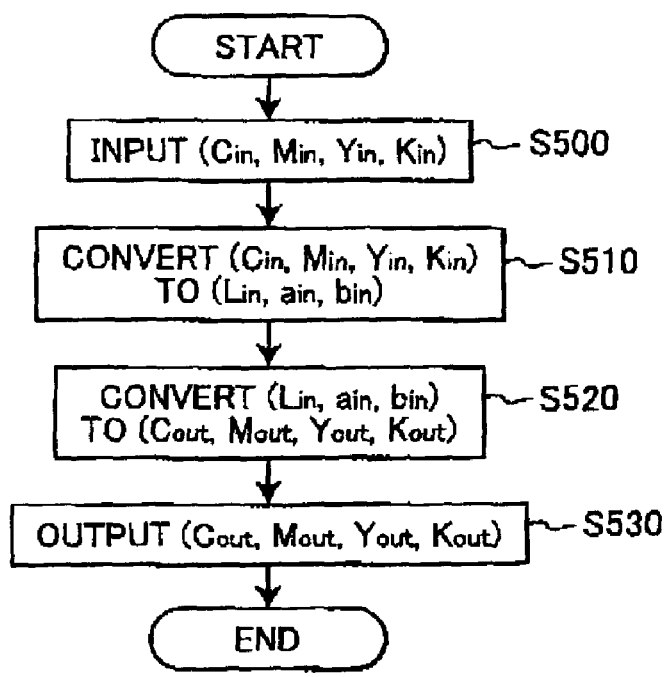
FIG. 24 is a flowchart illustrating the color conversion operations performed by the color management system in the color converting apparatus of the third embodiment.

As shown in FIG. 24, after the color management system CM is started, the CPU 10 reads in S500 original data (Cin, Min, Yin, Kin) that has been inputted into the buffer memory 20 for output on the printing device 6.

In S510, the CPU 10 converts the original data (Cin, Min, Yin, Kin) to Lab data (Lin, ain, bin) based on the input profile stored in the calorimetric measurements data saving unit 12d. More specifically, the original data (Cin, Min, Yin, Kin) is converted to Lab data (Lin, ain, bin) based on a correlation between the CMYK data and Lab data in the input profile (FIG. 22).

In S520-S530, processes equivalent to the steps S220-S230 of the first embodiment (FIG. 11) are executed to convert the Lab data (Lin, ain, bin) to corrected data (Cout, Mout, Yout, Kout) based on the output profile and to output this converted data to the inkjet printer 3.

The inkjet printer 3 performs a printing process based on the corrected data (Cout, Mout, Yout, Kout) on a paper type selected in S40 (FIG. 10) to produce a sample. The client views the sample under a light source type selected in S10 (FIG. 10) The color observed in this way will appear to be the same as the color on printed material to be printed by the printing device 6 on paper selected in S340 (FIG. 23) and observed under a light source selected in S310 (FIG. 23). Accordingly, the client can accurately determine the color state of the printed material to be printed by the printing device 6 by viewing the sample.

In the present embodiment described above, the color converting apparatus 1 converts the original data (Cin, Min, Yin, Kin) to Lab data (Lin, ain, bin) based on the input profile. The input profile has been created by calculating Equations (9)-(11) based on: the excitation characteristics Bi ($\lambda_0$, $\lambda$) for the two-dimensional excitation characteristics tables Ti' corresponding to the paper type used on the printing device 6, and the relative spectral radiation characteristics S($\lambda$) for the light source used in the printed-material observation environment. The color converting apparatus 1 converts the Lab data (Lin, ain, bin) to corrected data (Cout, Mout, Yout, Kout) based on the output profile. The output profile has been created by calculating Equations (9)-(11) based on the excitation characteristics Bi ($\lambda_0$, $\lambda$) for the two-dimensional excitation characteristics tables Ti corresponding to the paper type to be used on the inkjet printer 3, and the relative spectral radiation characteristics S($\lambda$) for the light source used in the sample observation environment. Accordingly, when a sample created according to the corrected data (Cout, Mout, Yout, Kout) is observed under the observation environment for the sample, the colors of the sample will appear the same as those observed on the final printed material under the observation environment for the final printed material, even when the sample and/or final printed material contains a fluorescent component.

It is noted that the output profile can be created in the present embodiment as in the fifth modification of first embodiment (FIG. 13). That is, the desired environment light characteristics data array D' (FIG. 12) can be inputted into the color converting apparatus 1 in S10', shown in FIG. 13, and used for creating the output profile.

More specifically, the client uses a spectrophotometer to measure a plurality of relative spectral radiation characteristics data sets S'($\lambda$) for a plurality of incident light wavelengths $\lambda$ at 10-nm intervals across the incident light wavelength range (300-780 nm) in the environment in which the client will check the samples. A desired environment light characteristics data array D' (FIG. 12) is formed from the plurality of data sets S'($\lambda$), and is stored on a floppy disk or a CD-R. The user can receive the floppy disk or CD-R from the client and insert the floppy disk or CD-R into the floppy disk drive 26 or the CD-ROM drive 28 of the color converting apparatus 1. Alternatively, the client can transmit the desired data array D' to the color converting apparatus 1 via the network 30. The CPU 10 downloads the desired data array D' from the network 30 in S10' and stores the data array D' in a work area of the RAM 12.

Similarly, when creating the input profile, a desired environment light characteristics data array D' can be inputted into the color converting apparatus 1 in S310. In this case, the process of S320 in FIG. 23 is omitted. More specifically, a spectrophotometer is used to measure a plurality of sets of relative spectral radiation characteristics S'($\lambda$) for a plurality of incident light wavelengths $\lambda$ across the incident light wavelength range (300-780 nm) for the environment in which the printed material created by the printing device 6 will be observed. A desired environment light characteristics data array D' is formed from the plurality of data sets S'($\lambda$). This data array D' is inputted into the color converting apparatus 1 via the floppy disk drive 26, the CD-ROM drive 28, or the network 30.

As described above, according to the present embodiment, the type of paper used to produce the printed material and the type of light source in which the printed material will be observed are designated, and the input profile is created based on the designated paper type and light source type. Similarly, the type of paper used to produce the sample and the type of light source in which the sample will be observed are designated, and the output profile is created based on the designated paper type and light source type.

Image data (Cin, Min, Yin, Kin) is converted into Lab data (Lin, ain, bin) by using the input profile. The Lab data (Lin, ain, bin) is then converted into corrected image data (Cout, Mout, Yout, Kout) by using the output profile. Accordingly, although the samples are printed on the inkjet printer 3 that is different from the printing device 6 used for producing the final printed material, the samples can accurately show the color state of the printed materials, despite the fact that the samples are produced on a sheet type different from that of the final printed material and that the samples are observed in an environment different from the final observation environment. In this way, colors to be outputted by the printer 6 and to be observed in the input-end observation environment are accurately reproduced by the inkjet printer 3 in the output-end observation environment. Accordingly, it is possible to accurately check the state of colors for final printed materials by viewing the samples.

According to the present embodiment, the input profile is created by taking account for the combinations of input-end observation environment and excitation characteristics of colors produced on the printing device 6. Accordingly, it is possible to convert CMYK image data for the printing device 6 into Lab color quantities that account for the interaction between this excitation and input-end observation environment, even when the color produced on the printing device 6 excites light of a wavelength different from that of the incident light. Similarly, the output profile-is created by taking into account the combinations of the output-end observation environment and excitation characteristics of colors produced on the inkjet printer 3. Accordingly, it is possible to convert the Lab color quantities into converted CMYK image data that accounts for the interaction between this excitation and the output-end observation environment, even when the color produced on the inkjet printer 3 excites light of a wavelength different from that of the incident light. By outputting this converted image data to the inkjet printer 3, the color outputted by the inkjet printer 3 and observed in the output-end observation environment appears the same as the so color outputted by the printing device 6 and observed in the input-end observation environment.

It is noted that the color converting apparatus 1 may be connected to both of the printer 6 and the inkjet printer 3. In this case, the user controls the color converting apparatus 1 to produce the input profile and the output profile, to convert original image data (Cin, Min, Yin, Kin) into corrected image data (Cout, Mout, Yout, Kout) by using the input and output profiles, and to output the corrected image data (Cout, Mout, Yout, Kout) to the inkjet printer 3 to produce samples After the client checks the samples and confirms that he/she is satisfied with the color state of the sample, the user controls the color converting apparatus 1 to output the original image data (Cin, Min, Yin, Kin) to the printing device 6 to produce final printed materials.

However, it is unnecessary to connect the color converting apparatus 1 to the printer 6 or the inkjet printer 3. The color converting apparatus 1 may not be connected to any of the printing device 6 and the inkjet printer 3. For example, the user has the printing device 6 installed in his/her printing shop, while the client has an ink jet printer 3 installed in his/her home. The color converting apparatus 1 is provided in the user's printing shop but separate from the printing device 6.

In such a case, the user prepares the original image data (Cin, Min, Yin, Kin), which is to be inputted into the printing device 6. The user then loads the original image data (Cin, Min, Yin, Kin) into the color converting apparatus 1 by using a floppy disk, CD-R, network 30, or the like. The user controls the color converting apparatus 1 to produce the input profile and the output profile, and to convert the original image data (Cin, Min, Yin, Kin) into corrected image data (Cout, Mout, Yout, Kout) by using the input and output profiles. The user then records the corrected image data (Cout, Mout, Yout, Kout) on a floppy disk or a CD-R, or uploads the corrected image data (Cout, Mout, Yout, Kout) to the network 30. The client receives the floppy disk or the CD-R, and loads the corrected image data (Cout, Mout, Yout, Kout) into his/her own computer that is connected to the inkjet printer 3. The client can download the corrected image data (Cout, Mout, Yout, Kout) into his/her computer from the network 30. The client's computer controls the inkjet printer 3 to produce samples. After the client checks the samples and informs the user of his/her satisfaction of the color state, the user controls his/her printing device 6 by the original image data (Cin, Min, Yin, Kin) to produce final printed materials.

It is noted that the color converting apparatus 1 may be connected to the printing device 6 or the inkjet printer 3. When the color converting apparatus 1 is connected to the printing device 6, the color converting apparatus 1 can perform not only the profile-making and color-converting operation but also control of the printing device 6 Similarly, when the color converting apparatus 1 is connected to the inkjet printer 3, the color converting apparatus 1 can perform not only the profile-making and color-converting operation but also control of the inkjet printer 3.

<Modification>

Next, a modification of the present embodiment will be described.

When color forming media, such as paper and ink, used by the printing device 6 do not contain a fluorescent component, the color produced by the printing device 6 will occur no excitation, but generates only the reflected light of the wavelength $\lambda_O$ equivalent to that of the incident light wavelength $\lambda$. In such a case, the two-dimensional excitation characteristics table Ti' ($0 \leq i \leq 753$) is created as shown in FIG. 25. That is, all the sets of excitation-reflectance data Bi ($\lambda_O, \lambda$), except for those for $\lambda_O = \lambda$, are set to zero (0).

In this case, a one-dimensional reflectance tables Ti" ($0 \leq i \leq 753$), as shown in FIG. 26, can be stored in the excitation characteristic storage unit 14f (FIG. 20) in place of the two-dimensional table Ti' ($00 \leq i \leq 753$) of FIG. 25. Each one-dimensional table Ti" stores a plurality of reflectance data sets (non-excitation reflectance data sets) Bi ($\lambda$) in correspondence with a plurality of incident light wavelengths $\lambda$ (=300, 310, 320, ..., 780 nm) at 10-nm intervals within the wavelength range of 300-780 nm of the incident light wavelength $\lambda$. In this case, the incident light wavelength $\lambda$ is equivalent to the reflected light wavelength $\lambda_O$. Each reflectance data set Bi ($\lambda$) is indicative of the ratio of the amount of the reflected light at the wavelength $\lambda$, which is generated in response to incidence of the incident light with the same wavelength $\lambda$, with respect to the amount of the incident light at the wavelength $\lambda$.

In order to create an input profile in this case, the flowchart of FIG. 23 is modified so as to omit step S360, and the process proceeds directly from S350 to S370. In S370, XYZ values Xi, Yi, and Zi are calculated using the following Equation (12):

$$Xi = K * \int_{880}^{780} (Bi(\lambda) * S(\lambda) * x(\lambda))\,d\lambda \qquad (12)$$

$$Yi = K * \int_{880}^{780} (Bi(\lambda) * S(\lambda) * y(\lambda))\,d\lambda$$

$$Zi = K * \int_{880}^{780} (Bi(\lambda) * S(\lambda) * z(\lambda))\,d\lambda$$

$$K = 100 \Big/ \int_{880}^{780} (S(\lambda) * y(\lambda))\,d\lambda$$

Subsequently, the values L*, a*, and b* are calculated based on Equation (11).

<Another Modification>

In the above-described embodiment, the input profile is created, and stored in the input profile saving unit 12e. However, in the same manner as in the second embodiment, a plurality of input profiles may be created in advance in correspondence with a plurality of paper types and a plurality of light source types. The plurality of input profiles are stored in the ROM 14 in the same manner as shown in FIG. 14. One input profile may be simply selected according to a user's selected light source type and paper type.

While the invention has been described in detail with reference to specific embodiments thereof, it would be apparent to those skilled in the art that many modifications and modifications may be made therein without departing from the spirit of the invention, the scope of which is defined by the attached claims.

For example, in the first and third embodiments, a plurality of paper types can be used on the inkjet printer 3. Accordingly, the excitation characteristic storage unit 14c stores 754 tables T0-T753 (FIG. 3) in correspondence with each paper type. When the user selects one paper type in S40 of the output profile creating process (FIG. 10), the CPU 10 reads the corresponding 754 tables T0-T753 from the storage unit 14c in S50.

However, when only a single paper type can be used on the inkjet printer 3, the storage unit 14c need only store 754 tables T0-T753 for that paper type. Hence, the paper type selecting step S40 is no longer needed in the output profile creating process of FIG. 10. After completing S30, the program may directly proceed to S50, wherein the 754 tables T0-T753 are read from the storage unit 14c.

In this case, when taking into account a plurality of ink types, such as in the third modification of the first embodiment, the excitation characteristic storage unit 14c can store 754 tables T0-T753 in correspondence with each type of ink that can be used in the inkjet printer 3. Each table Ti ($0 \leq i \leq 753$) is configured of a plurality of data sets Bi ($\lambda_O$, λ) for a plurality of incident light wavelengths λ and for a plurality of reflected light wavelengths $\lambda_O$. Each data set Bi ($\lambda_O$, λ) is determined by measuring a color patch of the corresponding color i created using the corresponding ink type. In this case, the user selects an ink type in S40 of FIG. 10. In S50, CPU 10 can select the 754 tables T0-T753 corresponding to the ink type selected by the user.

Similarly, a plurality of paper types can be used on the inkjet printer 3 in the second embodiment. Accordingly, the output profile storage unit 14e stores nine output profiles (FIG. 14) corresponding to combinations of the plurality of (three) paper types and a plurality of (three) light source types. Therefore, when the user selects a single paper type in S160 during the color conversion process of FIG. 16, the CPU 10 reads the corresponding output profile from the output profile storage unit 14e in S170.

However, when only a single paper type can be used on the inkjet printer 3, the output profile storage unit 14e need only store three output profiles corresponding to the combinations of the single paper type and the three light source types. Hence, the paper type selecting step of S160 is no longer necessary in the color converting process of FIG. 16. After selecting a light source type in S150, the CPU 10 can execute the process of S170 to read the output profile corresponding to the selected light source type from the output profile storage unit 14e.

In this case, if considering a plurality of ink types, such as in the second modification of the second embodiment, the output profile storage unit 14e can store a plurality of output profiles corresponding to all the combinations of ink types and light source types. In this case, the user selects an ink type in S160 of FIG. 16. In S170, the CPU 10 can select an output profile corresponding to the combination of light source type and ink type selected by the user.

There are cases when the output image created by the inkjet printer 3 will be observed always under a single type of light source. In this case, the spectral radiation characteristic storage unit 14d (FIG. 5) in the first and third embodiments can store only a single environment light characteristics data array D for a single light source. The light source type selecting step of S10 is no longer necessary in the output profile creating step of FIG. 10. In S20, the CPU can read the single data array D from the storage unit 14d. In the second embodiment, the output profile storage unit 14e (FIG. 14) can store only three output profiles for the combination of the single light source type and the three paper types. Hence, the light source type selecting step of S150 is no longer necessary in the color conversion process of FIG. 16. After a paper type is selected in S160, the CPU 10 can read in S170 the output profile corresponding to the selected paper type.

Figure 18:
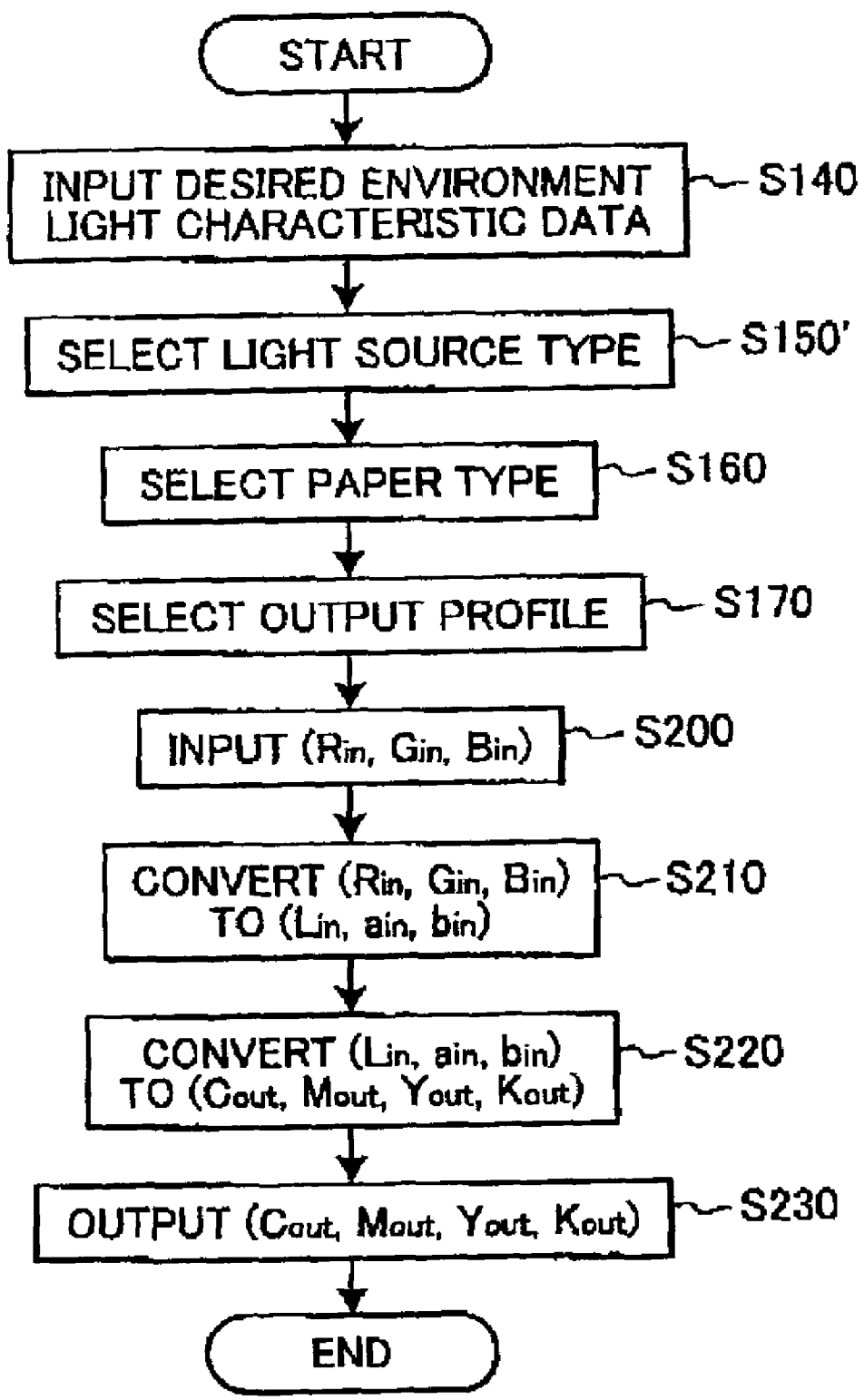
FIG. 18 is a flowchart illustrating the color conversion operations performed by the color management system in the color converting apparatus according to the first modification of the second embodiment.

It is also possible to modify the step of S10' in the fifth modification of the first embodiment in FIG. 13 to operate similar to S140-S150' in the first modification of the second embodiment in FIG. 18. Hence, when the user inputs the desired environment light characteristics data array D' in S10' of FIG. 13, the CPU 10 selects the environment light characteristics data array D nearest the inputted desired environment light characteristics data array D' from the spectral radiation characteristics table (FIG. 5) and stores the environment light characteristics data array D in the work area of the RAM 12. Steps from S30 on create the output profile based on this environment light characteristics data array D.

When creating an output profile in the first embodiment, the spectral reflection data calculating unit 120 calculates the spectral reflection characteristic data Ri($\lambda_O$) for each color i using Equation (9). After the spectral reflection characteristics data Ri($\lambda_O$) is saved in the spectral reflection data saving unit 12c, the color value computing unit 130 calculates the XYZ values (Xi, Yi, Zi) based on Equation (10). However, the spectral reflection data calculating unit 120 and spectral reflection data saving unit 12c can be omitted. In this case, the color value computing unit 130 determines the XYZ values (Xi, Yi, Zi) corresponding to each color i directly by calculating the following Equation (13):

$$Xi = K * \int_{880}^{780} \left\{ \left( \int_{800}^{780} (Bi(\lambda o, \lambda) * S(\lambda)) d\lambda \right) * x(\lambda o) \right\} d\lambda o \quad (13)$$

$$Yi = K * \int_{880}^{780} \left\{ \left( \int_{800}^{780} (Bi(\lambda o, \lambda) * S(\lambda)) d\lambda \right) * y(\lambda o) \right\} d\lambda o$$

$$Zi = K * \int_{880}^{780} \left\{ \left( \int_{800}^{780} (Bi(\lambda o, \lambda) * S(\lambda)) d\lambda \right) * z(\lambda o) \right\} d\lambda o$$

$$K = 100 \Big/ \int_{880}^{780} (S(\lambda) * y(\lambda)) d\lambda$$

Equation (13) takes a double integral of the excitation reflectance characteristics data Bi ($\lambda_O$, λ) for the user's selected paper type and the relative spectral radiation characteristics data S(λ) for the user's selected light source type.

The embodiments described above use the inkjet printer 3 as an example of the color outputting device. However, the color outputting device can be another type of color printer. That is, the present invention can be applied to any other color printers that employ ink, toner, ink ribbons, or other image developing material having a component material with excitation characteristics, such as a fluorescent matter.

In the above-described embodiments, the color converting apparatus 1 serves as a host computer that outputs CMYK print data (Cout, Mout, Yout, Kout) to the printer 3. In this way, the color converting apparatus 1 may be integrated in the host computer. It is noted that the color converting apparatus 1 can be incorporated in a printer driver program called a print driver. That is, the computer programs for executing each process of the color converting method (FIGS. 10, 11, 13, 16, 18, 23, and 24) may be included in the print driver program. Before outputting image data, created by a suitable application program on the host computer, to the printer, the printer driver program converts the image data to print data. During this conversion process, the host computer 1 selects excitation characteristics of the developing materials (color reproducing medium) and output-end observation environment. In this case, the host computer performs these selections.

It is noted that the printer driver program can be prestored in the host computer. Preferably, the printer driver program may be installed on a suitable host computer as a software program to be executed when necessary. In such a case, the printer driver program functions to support changes in the output-end observation environment, color reproducing media and the like. For example, the printer driver program can be stored on a computer-readable recording medium, such as a floppy disk or a CD-ROM. The computer can read the recording medium and install the program on a nonvolatile recording medium, such as the hard disk 16 of the host computer. When necessary, the printer driver is read and executed. In addition to reading the program from a recording medium, the driver program may be installed on the host computer via the network 30 such as the Internet, or the like.

In the embodiments described above, the color converting apparatus 1 is provided separately from the color printer 3.

However, it is also possible to integrally incorporate the color converting apparatus 1 in the printer 3. In this case, the printer 3 receives RGB image data used by the image display device 2 from an external device. The built-in color converting apparatus converts the RGB image data into corrected CMYK image data according to the color characteristics of the developing materials used by the printer 3 and the observation environment.

In the above-described third embodiment, the CPU 10 stores, in S410 (FIG. 23), a correlation between all the $101^4$ sets of CMYK data and the corresponding $101^4$ Lab data sets as the input profile. In this case, the $101^4$ sets of CMYK data are made up from: (0,0,0,0), (0,0,0,1), (0,0,0,2), ..., (100, 100, 100, 100), which are set at (1)-value interval from 0 to 100. However, the CPU 10 may store, as the input profile, a correlation between only the $11^4$ sets of CMYK data and corresponding $11^4$ Lab data sets. In this case, the $11^4$ sets of CMYK data are made up from: (0,0,0,0), (0,0,0,10), (0,0,0,20), ..., (100, 100, 100, 100), which are set at (10)-value interval from 0 to 100. In this case, in S510 (FIG. 24), the CPU 10 converts the original data (Cin, Min, Yin, Kin) to Lab data (Lin, ain, bin) through interpolation based on the input profile.

Similarly, in the above-described embodiments, a correlation between all the $101^4$ sets of CMYK data and the corresponding $101^4$ Lab data sets are first produced, and then an inverse calculation is performed to obtain the output profile. The thus produced output profile shows the correlation between $101^4$ Lab data sets and the $101^4$ sets of CMYK data, wherein the $101^4$ sets of CMYK data are made up from: (0,0,0,0), (0,0,0,1), (0,0,0,2), ..., (100, 100, 100, 100), which are set at (1)-value interval from 0 to 100. The output profile is stored in the output profile saving unit 12*a*. However, the CPU 10 may store, as the output profile, a correlation between only $11^4$ Lab data sets and the $11^4$ sets of CMYK data, wherein the $11^4$ sets of CMYK data are made up from: (0,0,0,0), (0,0,0,10), (0,0,0,20), ..., (100, 100, 100, 100), which are set at (10)-value interval from 0 to 100.

What is claimed is:

1. A color converting apparatus, comprising:
    an image data inputting portion inputting image data;
    a color converting portion performing color conversion on the image data to generate converted image data, the color converting portion performing the color conversion by using information on output-end color conversion characteristics, which is determined based on information on excitation characteristics of a color that is outputted by a color outputting device; and
    a converted image data outputting portion outputting the converted image data,
    wherein the color outputting device outputs the color in response to a color control signal i, the color producing light with a generated light wavelength $\lambda_0$ in response to incidence of light with an incident light wavelength $\lambda$, a set of excitation characteristics data Bi $(\lambda_0, \lambda)$ being defined as indicating a ratio of an amount of the light with the wavelength $\lambda_0$ relative to the amount of the light with the wavelength $\lambda$, the generated light wavelength $\lambda_0$ being equal to or different from the incident light wavelength $\lambda$, and
    wherein information on excitation characteristics of the color corresponding to the color control signal i includes a plurality of sets of excitation characteristics data Bi $(\lambda_0, \lambda)$ for a combination of a plurality of incident light wavelengths $\lambda$ and a plurality of generated light wavelengths $\lambda_0$.

2. A color converting apparatus as claimed in claim 1, wherein the color converting portion includes:
    an input-end color converting portion converting the image data into color quantity data using input-end color conversion characteristics of the image data; and
    an output-end color conversion portion converting the color quantity data to converted image output data using the output-end color conversion characteristics.

3. A color converting apparatus as claimed in claim 1, wherein the plurality of generated light wavelengths $\lambda_0$ are defined in a predetermined generated light wavelength range which includes a predetermined human visible range, and the plurality of incident light wavelengths $\lambda$ are defined within a predetermined incident light wavelength range which includes the predetermined human visible range and at least a part of a predetermined ultraviolet range.

4. A color converting apparatus as claimed in claim 1, wherein the color for the color control signal i reflects light with the generated light wavelength $\lambda_0$ upon incidence of the light with the incident light wavelength $\lambda$, the set of excitation characteristics data Bi $(\lambda_0, \lambda)$ being defined as a reflectance indicative of a ratio of an amount of reflected light with a wavelength $\lambda_0$ relative to an amount of the incident light with the wavelength $\lambda$.

5. A color converting apparatus as claimed in claim 1, wherein the color for the color control signal i transmits light with the generated light wavelength $\lambda_0$ upon incidence of the light with the incident light wavelength $\lambda$, the set of excitation characteristics data Bi $(\lambda_0, \lambda)$ being defined as a transmittance indicative of a ratio of an amount of reflected light with the wavelength $\lambda_0$ relative to an amount of the incident light with the wavelength $\lambda$.

6. A color converting apparatus as claimed in claim 1, wherein the information on the output-end color conversion characteristics is determined based on the information on the excitation characteristics of the color outputted by the color outputting device, and information on output-end environment characteristics, which indicates an environment on an output end, in which the color outputted by the color outputting device is to be observed.

7. A color converting apparatus as claimed in claim 6, wherein the information on the output-end environment characteristics includes a spectral radiation distribution array indicative of an output-end environment, the spectral radiation distribution array including a plurality of sets of relative spectral radiation characteristics data $S(\lambda)$ in correspondence with the plurality of incident light wavelengths $\lambda$, each relative spectral radiation characteristics data set $S(\lambda)$ being indicative of a relative amount of power of light at a corresponding incident light wavelength $\lambda$ in the output-end environment with respect to an amount of power of light at a predetermined incident light obtained in the output-end environment, and
    wherein the information on the output-end color conversion characteristics for the color corresponding to the color control signal i is defined by a spectral characteristic value $Ri(\lambda_0) = \int_{incident\ light\ wavelength\ range} Bi(\lambda_0, \lambda) * S(\lambda) d\lambda$.

8. A color converting apparatus as claimed in claim 7, wherein the color outputting device is capable of outputting a plurality of colors according to a plurality of predetermined color control signals i, and
    wherein the input-end color converting portion converts one set of image data, received by the image data inputting portion, into a set of device-independent color quantity data, wherein the output-end color converting portion converts the set of device-independent color quantity data into one of the plurality of color control signals, the output-end color converting portion converting the set of device-independent color quantity data into the one color control signal by using the following relationships:

$X = K^* \int_{\text{generated light wavelength range}} Ri(\lambda_0)^* x(\lambda_0) d\lambda_0,$ $Y = K^* \int_{\text{generated light wavelength range}} Ri(\lambda_0)^* y(\lambda_0) d\lambda_0,$ $Z = K^* \int_{\text{generated light wavelength range}} Ri(\lambda_0)^* z(\lambda_0) d\lambda_0,$ wherein $K = 100 / \int_{\text{incident light wavelength range}} S(\lambda)^* y(\lambda) d\lambda$, and $x(\lambda_0), y(\lambda_0), z(\lambda_0)$ are the spectral sensitivities X, Y, and Z of the human eye for the light with the wavelength $\lambda_0$.

9. A color converting apparatus as claimed in claim 8, wherein the device-independent color quantity data set includes a set of Lab color quantity data (L*, a*, b) which is defined by the following equations:

$L^* = 116^*(Y/Yn)^{1/3} - 16$ $a^* = 500^* \{(X/Xn)^{1/3} - (Y/Yn)^{1/3}\}$ $b^* = 200^* \{(Y/Yn)^{1/3} - (Z/Zn)^{1/3}\}$ wherein $Xn = K^* \int_{\text{incident light wavelength range}} S(\lambda)^* x(\lambda) d\lambda,$ $Yn = K^* \int_{\text{incident light wavelength range}} S(\lambda)^* y(\lambda) d\lambda,$ $Zn = K^* \int_{\text{incident light wavelength range}} S(\lambda)^* z(\lambda) d\lambda,$ and $x(\lambda), y(\lambda), z(\lambda)$ are the spectral sensitivities X, Y, and Z of the human eye for the light with the wavelength $\lambda$.

10. A color converting apparatus as claimed in claim 9, wherein the information on the output-end color conversion characteristics includes data of a correlation between the plurality of color control signals i and a plurality of sets of Lab color quantity values (L*, a*, b*), and wherein the output-end color converting portion converts a set of Lab color quantity data, obtained by the input-end color converting portion, into a color control signal by performing interpolation calculation based on the correlation between the plurality of color control signals i and a plurality of sets of Lab color quantity values (L*, a*, b*).

11. A color converting apparatus as claimed in claim 10, wherein the color outputting device is capable of outputting several groups of colors by using several kinds of color reproducing media, each group of colors corresponding to the plurality of color control signals i, the information on the excitation characteristics of each color group being defined by a plurality of excitation characteristics data sets $Bi(\lambda_0, \lambda)$, each data set being defined for the combinations of the plurality of incident light wavelengths $\lambda$ and the plurality of generated light wavelengths $\lambda_0$ for the corresponding color control signal i, further comprising:

an output-end color conversion characteristics storage portion storing, in correspondence with the several color reproducing media, several groups of correlation data between the plurality of color control signals i and the plurality of sets of Lab color quantity values (L*, a*, b*), each set of Lab color quantity values (L*, a*, b*) in each group being determined based on the plurality of sets of excitation characteristics data $Bi(\lambda_0, \lambda)$ for the corresponding color reproducing medium;

a medium designating portion designating one of the several color reproducing media to be used; and a correlation data group selection portion selecting, among the several correlation data groups, one correlation data group that corresponds to the designated color reproducing medium, and wherein the output-end color converting portion converts one set of Lab color quantity data, obtained by the input-end color converting portion, into a set of color control signal by using the selected correlation data group.

12. A color converting apparatus as claimed in claim 10, wherein the information on the output-end environment characteristics includes several spectral radiation distribution data arrays indicative of several output-end environments, each spectral radiation distribution data array including a plurality of sets of relative spectral radiation characteristics data $S(\lambda)$ for the corresponding environment in correspondence with the plurality of incident light wavelengths $\lambda$, further comprising:

an output-end color conversion characteristics storage portion storing, in correspondence with several output-end environments, several groups of correlation data between the plurality of color control signals i and the plurality of sets of Lab color quantity values (L*, a*, b*), each set of Lab color quantity values (L*, a*, b*) in each group being determined based on the plurality of sets of relative spectral radiation characteristics data $S(\lambda)$ in the spectral radiation distribution data array for the corresponding output-end environment and the plurality of sets of excitation characteristics data $Bi(\lambda_0, \lambda)$;

an output-environment designating portion designating one of the several output-end environments, in which the color to be outputted by the color outputting device is to be observed; and a correlation data group selection portion selecting, among the several correlation data groups, one correlation data group that corresponds to the designated output-end environment, and wherein the output-end color converting portion converts one set of Lab color quantity data, obtained by the input-end color converting portion, into a set of color control signal by using the selected correlation data group.

13. A color converting apparatus as claimed in claim 12, further comprising: an output-end environment data storage portion storing the several spectral radiation distribution data arrays indicative of the several output-end environments, wherein the output-environment designating portion includes:

a desired data inputting portion inputting a desired spectral radiation distribution data array indicative of a desired output-environments, each desired spectral radiation distribution data array including a plurality of sets of desired relative spectral radiation characteristics data $S'(\lambda)$ for the desired environment in correspondence with the plurality of incident light wavelengths $\lambda$; and output-end environment determination portion calculating a difference between the relative spectral radiation characteristics data $S(\lambda)$ in each spectral radiation distribution data array and the spectral radiation characteristics data S'($\lambda$) in the desired spectral radiation distribution data array over the prescribed incident light wavelength range, thereby determining one spectral radiation distribution data array, whose relative spectral radiation characteristics data S($\lambda$) are the closest to the desired relative spectral radiation characteristics data S'($\lambda$), and designating the one several output-end environment.

14. A color converting apparatus as claimed in claim 10, wherein the color outputting device is capable of outputting several groups of colors by using several kinds of color reproducing media, each group of colors corresponding to the plurality of color control signals i, the information on the excitation characteristics of each color group being defined by a plurality of excitation characteristics data sets Bi($\lambda_0$, $\lambda$), each data set being defined for the combinations of the plurality of incident light wavelengths $\lambda$ and the plurality of generated light wavelengths $\lambda_0$ for the corresponding color control signal i, wherein the information on the output-end environment characteristics includes several spectral radiation distribution data arrays indicative of several output-end environments, each spectral radiation distribution data array including a plurality of sets of relative spectral radiation characteristics data S($\lambda$) for the corresponding environment in correspondence with the plurality of incident light wavelengths $\lambda$, further comprising:

an output-end color conversion characteristics storage portion storing, in correspondence with several combinations of the several color reproducing media and the several output-end environments, several groups of correlation data between the plurality of color control signals i and the plurality of sets of Lab color quantity values (L*, a*, b*), each set of Lab color quantity values (L*, a*, b*) in each group being determined based on the plurality of sets of excitation characteristics data Bi($\lambda_0$, $\lambda$) for the corresponding color reproducing medium and on the plurality of sets of relative spectral radiation characteristics data S($\lambda$) in the spectral radiation distribution data array for the corresponding output-end environment;

a medium designating portion designating one of the several color reproducing media to be used;

an output-environment designating portion designating one of the several output-end environments, in which the color to be outputted by the color outputting device is to be observed; and a correlation data group selection portion selecting, among the several correlation data groups, one correlation data group that corresponds to a combination of the designated color reproducing medium and the designated output-end environment, and wherein the output-end color converting portion converts one set of Lab color quantity data, obtained by the input-end color converting portion, into a set of color control signal by using the selected correlation data group.

15. A color converting apparatus as claimed in claim 10, wherein the color outputting device is capable of outputting several groups of colors by using several kinds of color reproducing media, each group of colors corresponding to the plurality of color control signals i, the information on the excitation characteristics of each color group being defined by an excitation data group, the excitation data group including a plurality of excitation characteristics data sets Bi($\lambda_0$, $\lambda$), each data set being defined for the combinations of the plurality of incident light wavelengths $\lambda$ and the plurality of generated light wavelengths $\lambda_0$ for the corresponding color control signal i, further comprising:

an excitation characteristics storage portion storing several excitation data groups in correspondence with the several color reproducing media;

a medium designating portion designating one of the several color reproducing media to be used; and a correlation calculating portion producing a group of correlation data between the plurality of color control signals i and the plurality of sets of Lab color quantity values (L*, a*, b*) by calculating one set of Lab color quantity values (L*, a*, b*) for each color control signal i based on the plurality of sets of excitation characteristics data Bi($\lambda_0$, $\lambda$) in the excitation data group for the designated color reproducing medium, and wherein the output-end color converting portion converts one set of Lab color quantity data, obtained by the input-end color converting portion, into a color control signal by using the calculated correlation data group.

16. A color converting apparatus as claimed in claim 10, wherein the color outputting device is capable of outputting a plurality of colors in response to the plurality of color control signals i, the information on the excitation characteristics of the plurality of colors being defined by an excitation data group, the excitation data group including a plurality of excitation characteristics data sets Bi($\lambda_0$, $\lambda$), each data set being defined for the combinations of the plurality of incident light wavelengths $\lambda$ and the plurality of generated light wavelengths $\lambda_0$ for the corresponding color control signal i, further comprising:

an excitation characteristics storage portion storing the excitation data group;

a desired data inputting portion inputting a desired spectral radiation distribution data array indicative of a desired output-environments, each desired spectral radiation distribution data array including a plurality of sets of desired relative spectral radiation characteristics data S'($\lambda$) for the desired environment in correspondence with the plurality of incident light wavelengths $\lambda$, wherein the correlation calculating portion produces a group of correlation data between the plurality of color control signals i and the plurality of sets of Lab color quantity values (L*, a*, b*) by calculating one set of Lab color quantity values (L*, a*, b*) for each color control signal i based on the plurality of sets of desired relative spectral radiation characteristics data S'($\lambda$) and based on the plurality of sets of excitation characteristics data Bi($\lambda_0$, $\lambda$) in the excitation data group, and wherein the output-end color converting portion converts one set of Lab color quantity data, obtained by the input-end color converting portion, into a color control signal by using the calculated correlation data group.

17. A color converting apparatus as claimed in claim 10, wherein the color outputting device is capable of outputting a plurality of colors in response to the plurality of color control signals i, the information on the excitation characteristics of the plurality of colors being defined by an excitation data group, the excitation data group including a plurality of excitation characteristics data sets Bi($\lambda_0$, $\lambda$), each data set being defined for the combinations of the plurality of incident light wavelengths $\lambda$ and the plurality of generated light wavelengths $\lambda_0$ for the corresponding color control signal i, further comprising:

an output-end environment data storage portion storing several spectral radiation distribution data arrays indicative of several output-end environments, each spectral radiation distribution data array including a plurality of sets of relative spectral radiation characteristics data $S(\lambda)$ for the corresponding environment in correspondence with the plurality of incident light wavelengths $\lambda$;

an output-environment designating portion designating one of the several output-end environments, in which the color to be outputted by the color outputting device is to be observed; and a correlation calculating portion producing a group of correlation data between the plurality of color control signals i and the plurality of sets of Lab color quantity values (L*, a*, b*) by calculating one set of Lab color quantity values (L*, a*, b*) for each color control signal i based on the plurality of sets of relative spectral radiation characteristics data $S(\lambda)$ in a spectral radiation distribution data array for the designated output-end environment and based on the plurality of sets of excitation characteristics data $Bi(\lambda_0, \lambda)$ in the excitation data group, and wherein the output-end color converting portion converts one set of Lab color quantity data, obtained by the input-end color converting portion, into a color control signal by using the calculated correlation data group.

18. A color converting apparatus as claimed in claim 10, wherein the color outputting device is capable of outputting several groups of colors by using several kinds of color reproducing media, each group of colors corresponding to the plurality of color control signals i, the information on the excitation characteristics of each color group being defined by an excitation data group, the excitation data group including a plurality of excitation characteristics data sets $Bi(\lambda_0, \lambda)$, each data set being defined for the combinations of the plurality of incident light wavelengths $\lambda$ and the plurality of generated light wavelengths $\lambda_0$ for the corresponding color control signal i, further comprising:

an excitation characteristics storage portion storing several excitation data groups in correspondence with the several color reproducing media;

a medium designating portion designating one of the several color reproducing media to be used;

an output-end environment data storage portion storing several spectral radiation distribution data arrays indicative of several output-end environments, each spectral radiation distribution data array including a plurality of sets of relative spectral radiation characteristics data $S(\lambda)$ for the corresponding environment in correspondence with the plurality of incident light wavelengths $\lambda$;

an output-environment designating portion designating one of the several output-end environments, in which the color to be outputted by the color outputting device is to be observed; and a correlation calculating portion producing a group of correlation data between the plurality of color control signals i and the plurality of sets of Lab color quantity values (L*, a*, b*) by calculating one set of Lab color quantity values (L*, a*, b*) for each color control signal i based on the plurality of sets of excitation characteristics data $Bi(\lambda_0, \lambda)$ in the excitation data group for the designated color reproducing medium and based on the plurality of sets of relative spectral radiation characteristics data $S(\lambda)$ in a spectral radiation distribution data array for the designated output-end environment, and wherein the output-end color converting portion converts one set of Lab color quantity data, obtained by the input-end color converting portion, into a color control signal by using the calculated correlation data group.

19. A color converting apparatus as claimed in claim 10, further comprising:

an excitation characteristic storing portion prestoring, for each of the plurality of color control signals i, a plurality of sets of the excitation characteristics data $Bi(\lambda_0, \lambda)$, which are arranged in the form of a two-dimensional matrix in correspondence with a plurality of combinations of a plurality of the incident light wavelengths $\lambda$ within the incident light wavelength range and a plurality of generated light wavelengths $\lambda_0$ within the generated light wavelength range, $\lambda_0$ being at least equal to or greater than $\lambda$;

an output-end environment characteristics designating portion designating one desired environment characteristics data array indicative of a desired output-end observation environment, in which the color outputted by the color outputting device is desired to be observed, the desired environment characteristics data array being formed of a plurality of sets of relative spectral radiation characteristics data $S(\lambda)$ in correspondence with the plurality of incident light wavelengths $\lambda$ within the incident light wavelength range; and an output-end color conversion characteristic calculating portion calculating the output-end color conversion characteristics, by determining one set of Lab color quantity data (L*, a*, b*) for each color control signal i based on the plurality of excitation characteristics data sets $Bi(\lambda_0, \lambda)$ and the plurality of relative spectral radiation characteristics data sets $S(\lambda)$ that form the desired environment characteristics data array, and wherein the output-end color converting portion converts one set of Lab color quantity data, obtained by the input-end color converting portion, into a color control signal by using the calculated correlation data group.

20. A color converting apparatus as claimed in claim 19, wherein the output-end color conversion characteristic calculating portion includes:

a white color calculating portion;

a spectral characteristic value calculating portion; and a color value calculating portion, wherein the white color calculating portion determines a set of tristimulus values (Xn, Yn, Zn) for a perfectly diffuse surface by calculating the following equations based on the designated array of relative spectral radiation characteristics data $S(\lambda)$:

$Xn = K * \int_{\text{incident light wavelength range}} S(\lambda) * x(\lambda) d\lambda,$ $Yn = K * \int_{\text{incident light wavelength range}} S(\lambda) * y(\lambda) d\lambda,$ and $Zn = K * \int_{\text{incident light wavelength range}} S(\lambda) * z(\lambda) d\lambda,$ wherein $K = 100 / \int_{\text{incident light wavelength range}} S(\lambda) * y(\lambda) d\lambda;$ wherein the spectral characteristic value calculating portion determines the spectral characteristic value $Ri(\lambda_0)$ for each control signal i by calculating the following equation:

$$Ri(\lambda_0) = \int_{incident\ light\ wavelength\ range} Bi(\lambda_0, \lambda) * S(\lambda) d\lambda;$$
and wherein the color value calculating portion determines the Lab color value set (L*, a*, b*) for each control signal i, the color value calculating portion including:
an XYZ value calculating portion; and
an Lab value calculating portion, wherein the XYZ value calculating portion determines an XYZ value set (X, Y,Z) for each color control signal i by calculating the following equations based on the spectral characteristic value $Ri(\lambda_0)$:

$$X = K * \int_{generated\ light\ wavelength\ range} Ri(\lambda_0) * x(\lambda_0) d\lambda_0,$$

$$Y = K * \int_{generated\ light\ wavelength\ range} Ri(\lambda_0) * y(\lambda_0) d\lambda_0,$$
and $$Z = K * \int_{generated\ light\ wavelength\ range} Ri(\lambda_0) * z(\lambda_0) d\lambda_0,$$

wherein $x(\lambda_0)$, $y(\lambda_0)$, and $z(\lambda_0)$ are the spectral sensitivities X, Y, and Z of the human eye, and wherein the Lab value calculating portion determines the Lab color value set (L*, a*, b*) for each color control signal i by calculating the following equations based on the set of tristimulus values (Xn, Yn, Zn) and the XYZ color value set (X, Y, Z):

$$L^* = 116 * (Y/Yn)^{1/3} - 16,$$

$$a^* = 500 * \{(X/Xn)^{1/3} - (Y/Yn)^{1/3}\},\ \text{and}$$

$$b^* = 200 * \{(Y/Yn)^{1/3} - (Z/Zn)^{1/3}\},$$

wherein the XYZ color value calculating portion calculates the XYZ color value set $(X_{min}, Y_{min}, Z_{min})$ for a predetermined brightest color control signal $i_{min}$ that indicates the brightest color among all the color control signals i, and wherein the Lab color value calculating portion determines the Lab color value set $(L^*_{min}, a^*_{min}, b^*_{min})$ for the brightest color control signal $i_{min}$ by calculating the equations of $L^* = 116 * (Y_{min}/Y_{min}n)^{1/3} - 16 = 100$, $a^* = 500 * \{(X_{min}/X_{min})^{1/3} - (Y_{min}/Y_{min})^{1/3}\} = 0$, and $b^* = 200 * \{(Y_{min}/Y_{min})^{1/3} - (Z_{min}/Z_{min})^{1/3}\} = 0$, by resetting the tristimulus values Xn, Yn, and Zn for the brightest color control signal $i_{min}$ to be equal to the values of $X_{min}$, $Y_{min}$, $Z_{min}$.

21. A color converting apparatus as claimed in claim 20, wherein the color value calculating portion further includes a data retaining portion temporarily retaining the value of Y calculated by the XYZ color value calculating portion, the data retaining portion retaining data of Y even when the XYZ value calculating portion calculates the value Y for some color control signal i as being greater than the value Yn calculated by the white color calculating portion.

22. A color converting apparatus as claimed in claim 2, wherein the image data inputting portion receives the image data indicating an image defined by an image data handling device, the input-end color converting portion converting the received image data into color quantity data using input-end color conversion characteristics of the image data handling device.

23. A color converting apparatus as claimed in claim 2, wherein the image data inputting portion receives, as the image data, an input-end control signal which is to be inputted to an input-end color outputting device, the input-end color converting portion converting the input-end control signal into the color quantity data by using information on input-end color conversion characteristics, which is determined based on information on excitation characteristics of a color that is outputted by the input-end color outputting device based on the input-end color control signal, wherein the input-end color outputting device outputs a color in response to an input-end color control signal i, the color producing light with a generated light wavelength $\lambda_0$ in response to incidence of light with an incident light wavelength $\lambda$, a set of input-end excitation characteristics data $Bi(\lambda_0, \lambda)$ being defined as indicating a ratio of an amount of the light with the wavelength $\lambda_0$ a relative to the amount of the light with the wavelength $\lambda$, the generated light wavelength $\lambda_0$ being equal to or different from the incident light wavelength $\lambda$, and wherein the information on the excitation characteristics of the color corresponding to one input-end color control signal i includes a plurality of sets of input-end excitation characteristics data $Bi(\lambda_0, \lambda)$ for a combination of a plurality of incident light wavelengths $\lambda$ and a plurality of generated light wavelengths $\lambda_0$.

24. A color converting apparatus as claimed in claim 23, wherein the information on the input-end color conversion characteristics is determined based on: the information on the excitation characteristics of the color outputted by the input-end color outputting device, and information on input-end environment characteristics, which indicates an environment on an input end, in which the color outputted by the input-end color outputting device is to be observed.

25. A color converting apparatus as claimed in claim 24, wherein the information on the input-end environment characteristics includes a spectral radiation distribution array indicative of an output-end environment, the spectral radiation distribution array including a plurality of sets of relative spectral radiation characteristics data $S(\lambda)$ in correspondence with the plurality of incident light wavelengths $\lambda$, each relative spectral radiation characteristics data set $S(\lambda)$ being indicative of a relative amount of power of light at a corresponding incident light wavelength $\lambda$ in the input-end environment with respect to an amount of power of light at a predetermined incident light obtained in the input-end environment, and wherein the information on the input-end color conversion characteristics for the color corresponding to the input-end color control signal i is defined by a spectral characteristic value Ri $(\lambda_0) = \int_{incident\ light\ wavelength\ range} Bi(\lambda_0, \lambda) * S(\lambda) d\lambda$.

26. A color converting apparatus as claimed in claim 25, wherein the input-end color outputting device is capable of outputting a plurality of colors according to a plurality of predetermined input-end color control signals i, and wherein the input-end color converting portion converts one set of input-end color control signal, received by the image data inputting portion, into a set of device-independent color quantity data, by using the following relationships:

$$X = K * \int_{generated\ light\ wavelength\ range} Ri(\lambda_0) * x(\lambda_0) d\lambda_0,$$

$$Y = K * \int_{generated\ light\ wavelength\ range} Ri(\lambda_0) * y(\lambda_0) d\lambda_0,$$

$$Z = K * \int_{generated\ light\ wavelength\ range} Ri(\lambda_0) * z(\lambda_0) d\lambda_0,$$

wherein $K = 100 / \int_{incident\ light\ wavelength\ range} S(\lambda) * y(\lambda) d\lambda$, and $x(\lambda_0)$, $y(\lambda_0)$, $z(\lambda_O)$ are the spectral sensitivities X, Y, and Z of the human eye for the light with the wavelength $\lambda_O$.

27. A color converting apparatus as claimed in claim 26, wherein the device-independent color quantity data set includes a set of Lab color quantity data (L*, a*, b) which is defined by the following equations:

$$L^* = 116^*(Y/Yn)^{1/3} - 16$$

$$a^* = 500^* \{(X/Xn)^{1/3} - (Y/Yn)^{1/3}\}$$

$$b^* = 200^* \{(Y/Yn)^{1/3} - (Z/Zn)^{1/3}\}$$

wherein $$Xn = K^* \int_{incident\ light\ wavelength\ range} S(\lambda)^* x(\lambda) d\lambda,$$

$$Yn = K^* \int_{incident\ light\ wavelength\ range} S(\lambda)^* y(\lambda) d\lambda,$$

$$Zn = K^* \int_{incident\ light\ wavelength\ range} S(\lambda)^* z(\lambda) d\lambda,\ and$$

$x(\lambda), y(\lambda), z(\lambda)$ are the spectral sensitivities X, Y, and Z of the human eye for the light with the wavelength $\lambda$.

28. A color converting apparatus as claimed in claim 27, wherein the information on the input-end color conversion characteristics includes data of a correlation between the plurality of input-end color control signals i and a plurality of sets of Lab color quantity values (L*, a*, b*), and
wherein the input-end color converting portion converts a set of input-end color control signal, received by the image data inputting portion, into a Lab color quantity data set by using the correlation between the plurality of color control signals i and a plurality of sets of Lab color quantity values (L*, a*, b*).

29. A color converting apparatus as claimed in claim 28, wherein the input-end color outputting device is capable of outputting several groups of colors by using several kinds of color reproducing media, each group of colors corresponding to the plurality of input-end color control signals i, the information on the excitation characteristics of each color group being defined by an input-end excitation data group, the input-end excitation data group including a plurality of input-end excitation characteristics data sets $Bi(\lambda_O, \lambda)$, each data set being defined for the combinations of the plurality of incident light wavelengths $\lambda$ and the plurality of generated light wavelengths $\lambda_O$ for the corresponding color control signal i,
further comprising:
an input-end excitation characteristics storage portion storing several excitation data groups in correspondence with the several color reproducing media;
an input-end medium designating portion designating one of the several color reproducing media to be used at the input-end color outputting device;
an input-end environment data storage portion storing several spectral radiation distribution data arrays indicative of several input-end environments, each spectral radiation distribution data array including a plurality of sets of relative spectral radiation characteristics data $S(\lambda)$ for the corresponding environment in correspondence with the plurality of incident light wavelengths $\lambda$;
an input-environment designating portion designating one of the several input-end environments, in which the color to be outputted by the input-end color outputting device is to be observed; and a correlation calculating portion producing a group of correlation data between the plurality of input-end color control signals i and the plurality of sets of Lab color quantity values (L*, a*, b*) by calculating one set of Lab color quantity values (L*, a*, b*) for each input-end color control signal i based on the plurality of sets of input-end excitation characteristics data $Bi(\lambda_O, \lambda)$ in the input-end excitation data group for the designated color reproducing medium and based on the plurality of sets of relative spectral radiation characteristics data $S(\lambda)$ in a spectral radiation distribution data array for the designated input-end environment, and
wherein the input-end color converting portion converts an input-end color control signal, received by the image data inputting portion, into one set of Lab color quantity data by using the calculated correlation data group.

30. A color converting apparatus, comprising:
a color data inputting portion receiving device-independent color data;
a color converting portion performing color conversion on the device-independent color data to generate converted image data by using information on output-end color conversion characteristics, which is determined based on information on excitation characteristics of a color that is outputted by a color outputting device; and
a converted image data outputting portion outputting the converted image data,
wherein the color outputting device outputs the color in response to a color control signal i, the color producing light with a generated light wavelength $\lambda_O$ in response to incidence of light with an incident light wavelength $\lambda$, a set of excitation characteristics data $Bi(\lambda_O, \lambda)$ being defined as indicating a ratio of an amount of the light with the wavelength $\lambda_O$ relative to the amount of the light with the wavelength $\lambda$, the generated light wavelength $\lambda_O$ being equal to or different from the incident light wavelength $\lambda$, and
wherein information on excitation characteristics of the color corresponding to the color control signal i includes a plurality of sets of excitation characteristics data $Bi(\lambda_O, \lambda)$ for a combination of a plurality of incident light wavelengths $\lambda$ and a plurality of generated light wavelengths $\lambda_O$.

31. A color converting apparatus as claimed in claim 30, wherein the color outputting device is capable of outputting a plurality of colors according to a plurality of predetermined color control signals i, and
wherein the output-end color converting portion converts the device-independent color quantity data set into one of the plurality of color control signals,
wherein the information on the output-end color conversion characteristics is determined based on the information on the excitation characteristics of the color outputted by the color outputting device, and information on output-end environment characteristics, which indicates an environment on an output end, in which the color outputted by the color outputting device is to be observed, the information on the output-end environment characteristics including a spectral radiation distribution array indicative of an output-end environment, the spectral radiation distribution array including a plurality of sets of relative spectral radiation characteristics data $S(\lambda)$ in correspondence with the plurality of incident light wavelengths $\lambda$, each relative spectral radiation characteristics data set $S(\lambda)$ being indicative of a relative amount of power of light at a corresponding incident light wavelength $\lambda$ in the output-end environment with respect to an amount of power of light at a predetermined incident light obtained in the output-end environment, and wherein the output-end color converting portion converts the device-independent color quantity data set into the one color control signal by using the following relationships:

$X=K*\int_{generated\ light\ wavelength\ range}\{(\int_{incident\ light\ wavelength\ range}Bi(\lambda_0, \lambda)*S(\lambda)d\lambda)*x(\lambda_0)\}d\lambda_0,$ $Y=K*\int_{generated\ light\ wavelength\ range}\{(\int_{incident\ light\ wavelength\ range}Bi(\lambda_0, \lambda)*S(\lambda)d\lambda)*y(\lambda_0)\}d\lambda_0,$ $Z=K*\int_{generated\ light\ wavelength\ range}\{(\int_{incident\ light\ wavelength\ range}Bi(\lambda_0, \lambda)*S(\lambda)d\lambda)*z(\lambda_0)\}d\lambda_0,$ wherein $K=100/\int_{incident\ light\ wavelength\ range}S(\lambda)*y(\lambda)d\lambda$, and $x(\lambda_0)$, $y(\lambda_0)$, $z(\lambda_0)$ are the spectral sensitivities X, Y, and Z of the human eye for the light with the wavelength $\lambda_0$.

32. A color converting method, comprising the steps of:

inputting image data;

performing color conversion on the image data to generate converted image data, the color converting step performing the color conversion by using information on output-end color conversion characteristics, which is determined based on information on excitation characteristics of a color that is outputted by a color outputting device; and outputting the converted image data, wherein the color outputting device outputs the color in response to a color control signal i, the color producing light with a generated light wavelength $\lambda_0$ in response to incidence of light with an incident light wavelength $\lambda$, a set of excitation characteristics data Bi ($\lambda_0$, $\lambda$) being defined as indicating a ratio of an amount of the light with the wavelength $\lambda_0$ relative to the amount of the light with the wavelength $\lambda$, the generated light wavelength $\lambda_0$ being equal to or different from the incident light wavelength $\lambda$, and wherein information on excitation characteristics of the color corresponding to the color control signal i includes a plurality of sets of excitation characteristics data Bi ($\lambda_0$, $\lambda$) for a combination of a plurality of incident light wavelengths $\lambda$ and a plurality of generated light wavelengths $\lambda_0$.

33. A computer readable medium storing a set of color converting program instructions executable on a data processing device, the set of color converting program instructions comprising:

inputting image data;

performing color conversion on the image data to generate converted image data, the color converting program performing the color conversion by using information on output-end color conversion characteristics, which is determined based on information on excitation characteristics of a color that is outputted by a color outputting device; and outputting the converted image data, wherein the color outputting device outputs the color in response to a color control signal i, the color producing light with a generated light wavelength $\lambda_0$ in response to incidence of light with an incident light wavelength $\lambda$, a set of excitation characteristics data Bi ($\lambda_0$, $\lambda$) being defined as indicating a ratio of an amount of the light with the wavelength $\lambda_0$ relative to the amount of the light with the wavelength $\lambda$, the generated light wavelength $\lambda_0$ being equal to or different from the incident light wavelength $\lambda$, and wherein information on excitation characteristics of the color corresponding to the color control signal i includes a plurality of sets of excitation characteristics data Bi ($\lambda_0$, $\lambda$) for a combination of a plurality of incident light wavelengths $\lambda$ and a plurality of generated light wavelengths $\lambda_0$.

* * * * *